(12) United States Patent
Moradi

(10) Patent No.: US 10,921,227 B2
(45) Date of Patent: Feb. 16, 2021

(54) APPARATUS AND METHOD FOR FILLET PUNCH CREEP TESTING

(71) Applicant: Ali Moradi, Tehran (IR)

(72) Inventor: Ali Moradi, Tehran (IR)

( * ) Notice: Subject to any disclaimer, the term of this patent is extended or adjusted under 35 U.S.C. 154(b) by 308 days.

(21) Appl. No.: 16/012,154

(22) Filed: Jun. 19, 2018

(65) Prior Publication Data

US 2019/0137374 A1 May 9, 2019

(51) Int. Cl.
*G01N 3/24* (2006.01)
*G01N 3/28* (2006.01)

(52) U.S. Cl.
CPC .......... *G01N 3/24* (2013.01); *G01N 3/28* (2013.01); *G01N 2203/0033* (2013.01); *G01N 2203/0071* (2013.01)

(58) Field of Classification Search
CPC .... G01N 3/24; G01N 3/28; G01N 2203/0033; G01N 2203/0071
USPC .......................................................... 73/841
See application file for complete search history.

(56) References Cited

U.S. PATENT DOCUMENTS

| | | |
|---|---|---|
| 4,567,774 A | 2/1986 | Manahan et al. |
| 8,578,784 B2 | 11/2013 | Hyde et al. |
| 2009/0133381 A1 | 5/2009 | Holmes et al. |

FOREIGN PATENT DOCUMENTS

| | | |
|---|---|---|
| CN | 102042939 A | 5/2011 |
| CN | 102519803 A | 6/2012 |
| EP | 2672075 A1 | 11/2013 |
| KR | 20120010766 B1 | 11/2012 |

OTHER PUBLICATIONS

Moradi et al., "Fillet Punch Creep Test of Aluminum Alloy 2024-T851: A New Method to Assess Creep Properties of Materials", Exp. Tech. DOI 10.1007/s40799-016-0160-3, The Society for Experimental Mechanics, Inc., Oct. 2016, 9 pages.

*Primary Examiner* — Tarun Sinha
(74) *Attorney, Agent, or Firm* — NovoTechIP International PLLC

(57) ABSTRACT

An improved apparatus and method for fillet punch creep testing of a small specimen comprises, in one implementation, a testing unit secured to a top end and a bottom end of a structural support unit, and configured to conduct creep testing on a specimen. The testing unit includes a loading unit, a fillet punch unit, a thermal unit, and a measuring unit. A filleted punch of the fillet punch unit transfers an applied pressure from the loading unit to the specimen clamped between an upper die and a filleted lower die of the fillet punch unit while the thermal unit surrounds the fillet punch unit, and heats the specimen during testing. The optimized filleted edges on the filleted punch and the filleted lower die eliminate stress concentration against the specimen resulting in stable measurements, and thus, reduce the dispersion of applied load during creep testing. Finally, an application of a constant load on the filleted punch prevents dispersion in the measured data being analyzed by the measuring unit, and allows creep testing to be repeated to predict a remaining life of in-service parts of a system.

19 Claims, 29 Drawing Sheets

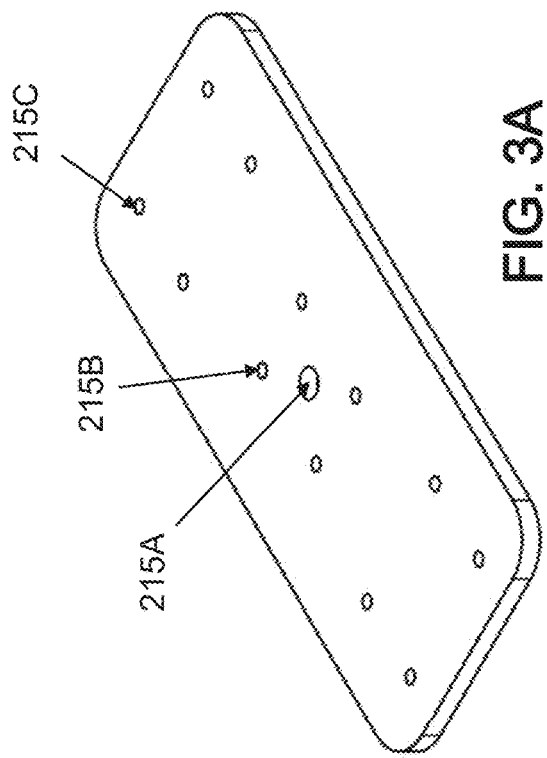
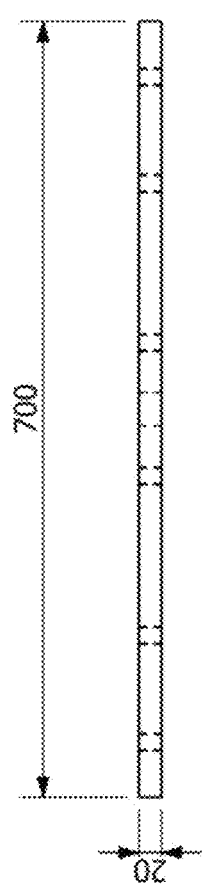
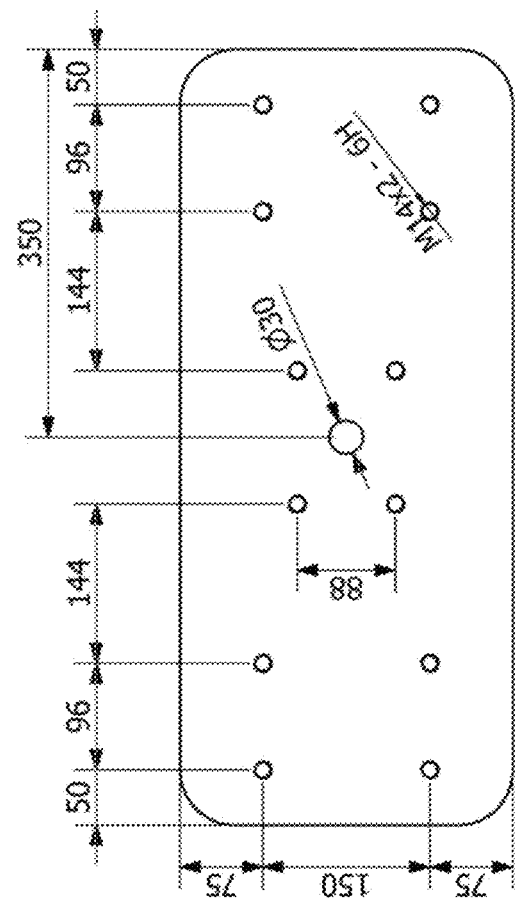
FIG. 3A
FIG. 3B
FIG. 3C

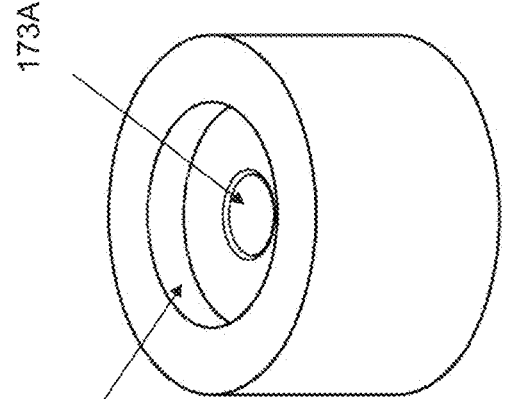
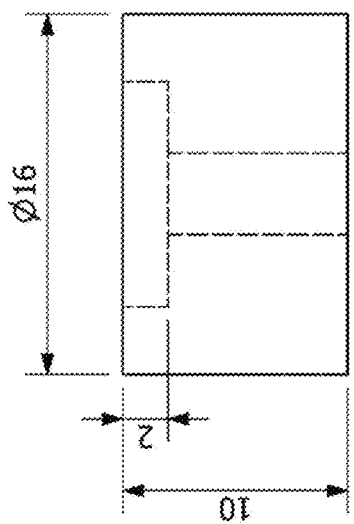
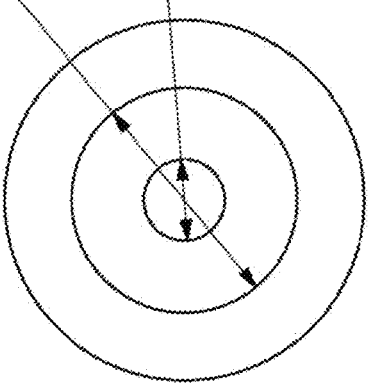

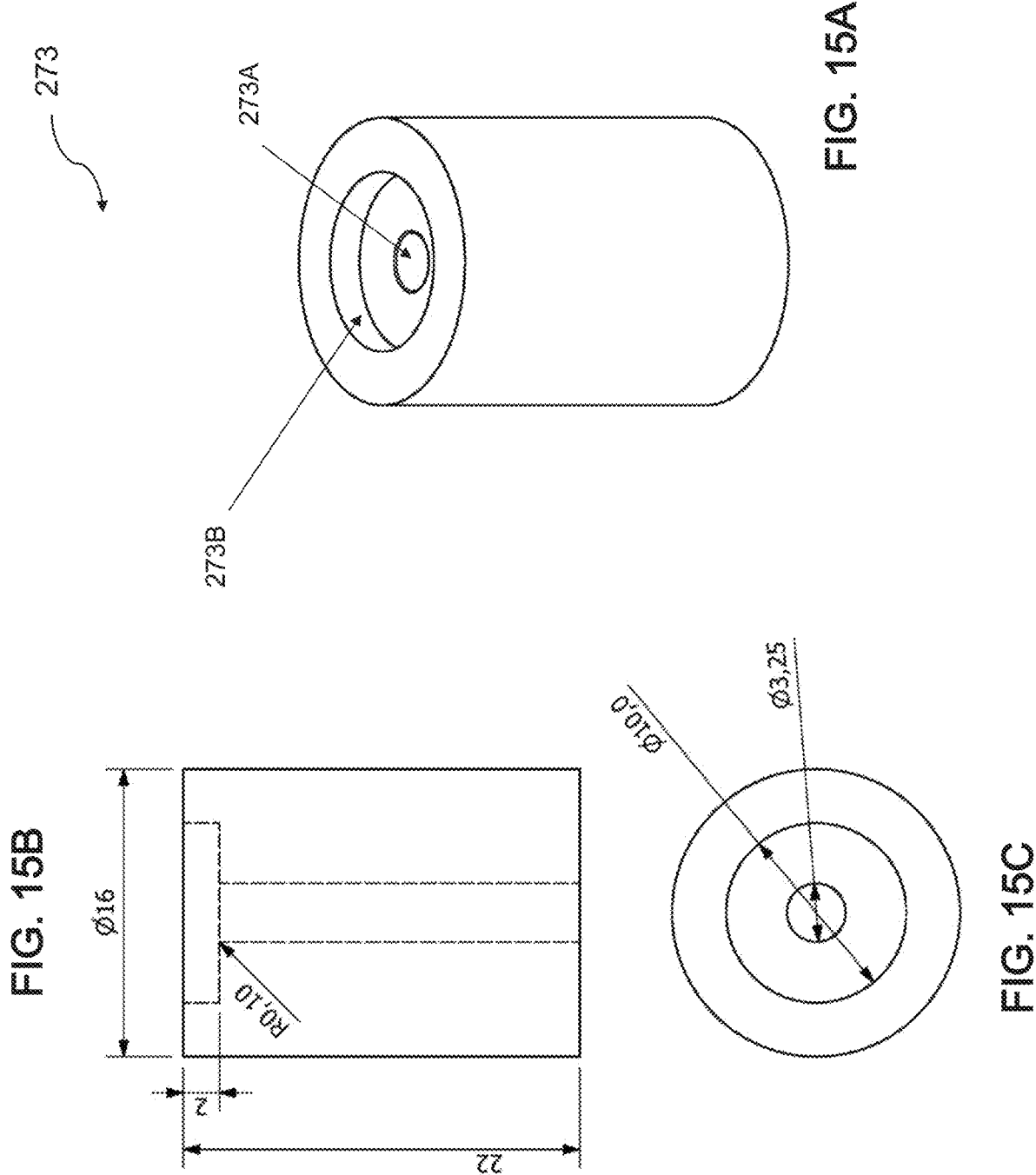

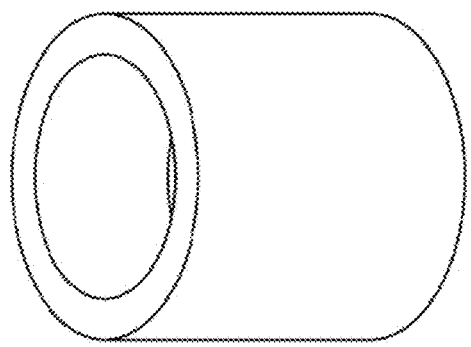
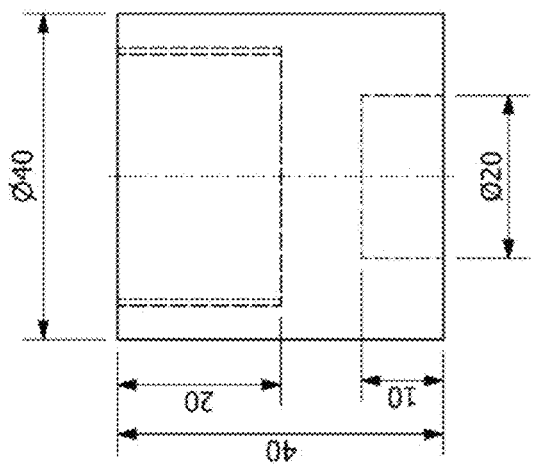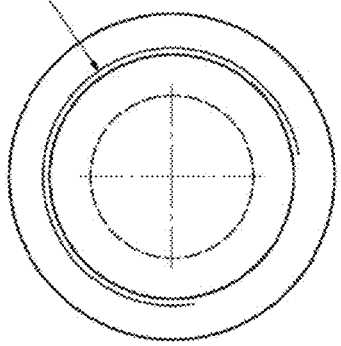
FIG. 16A
FIG. 16B
FIG. 16C

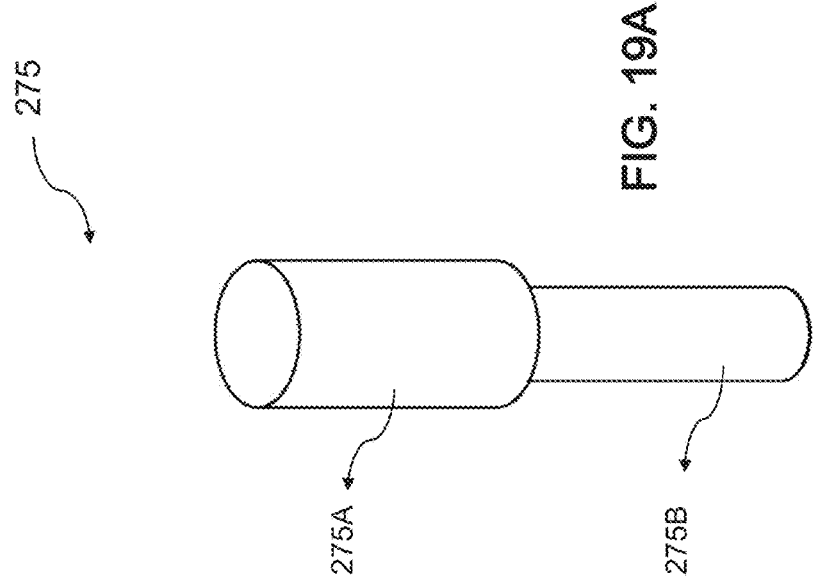
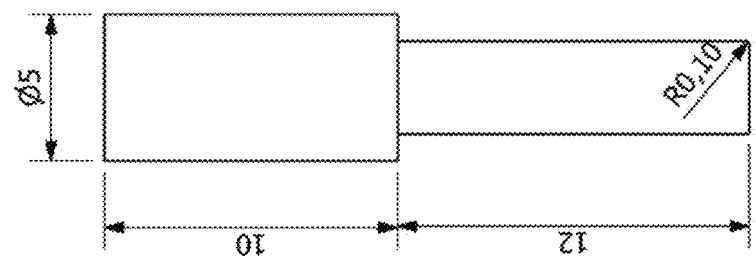
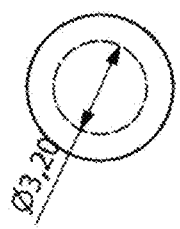

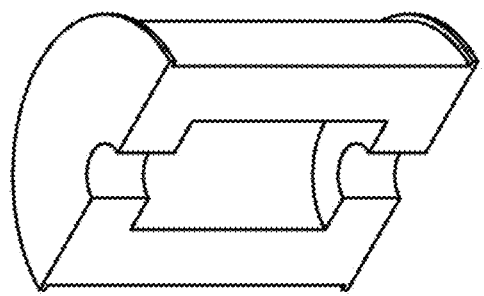
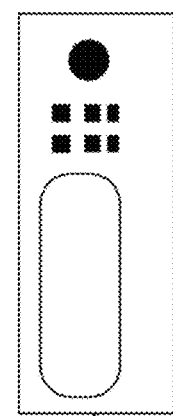
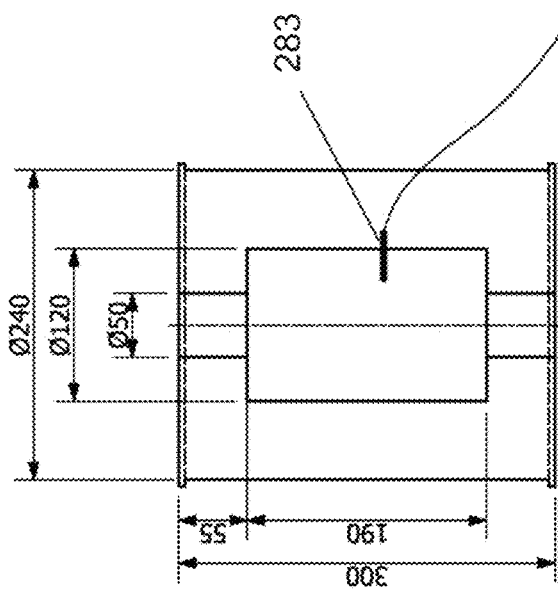
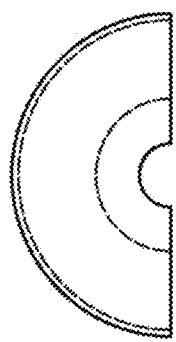
FIG. 20A
FIG. 20B
FIG. 20C

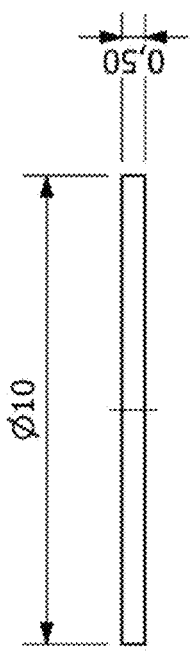
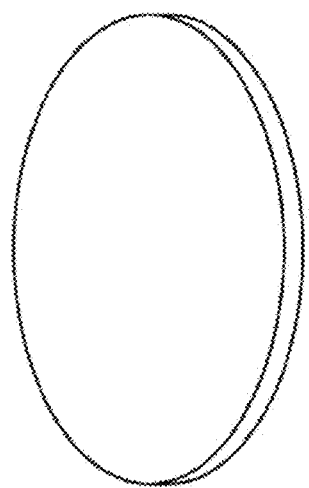
FIG. 21A
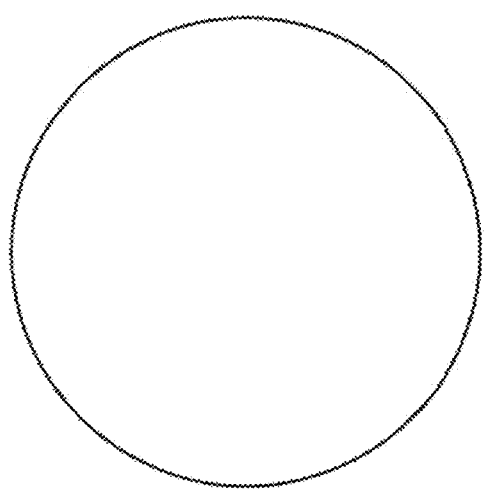
FIG. 21C
FIG. 21B

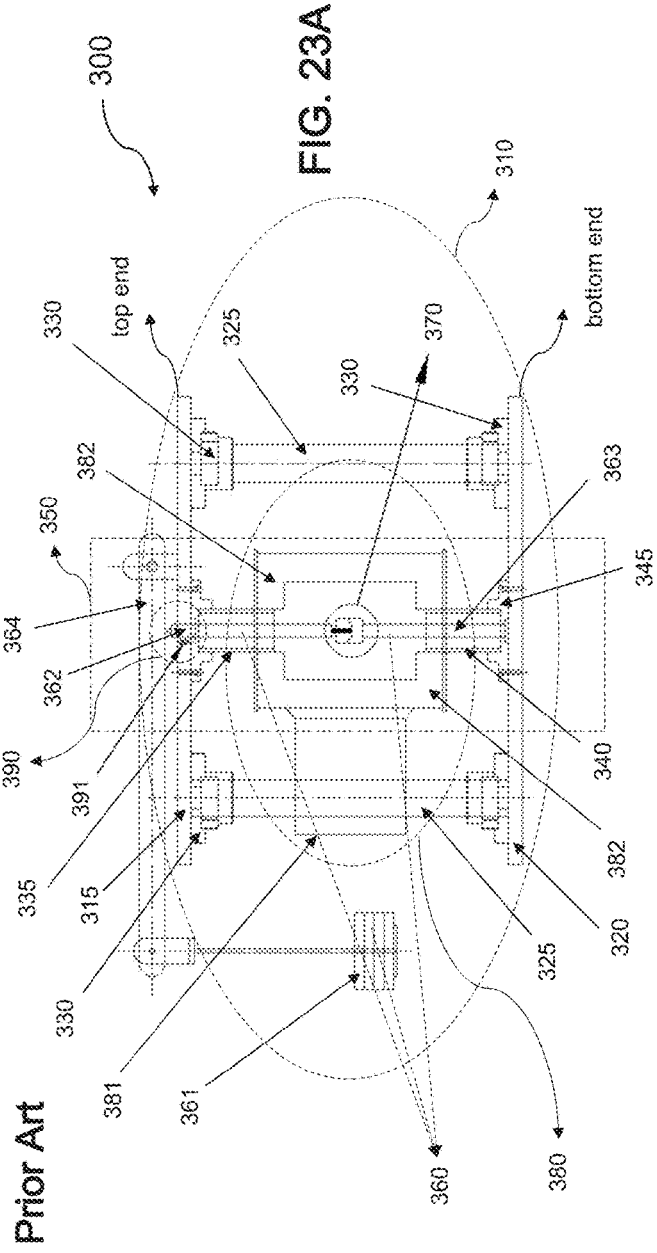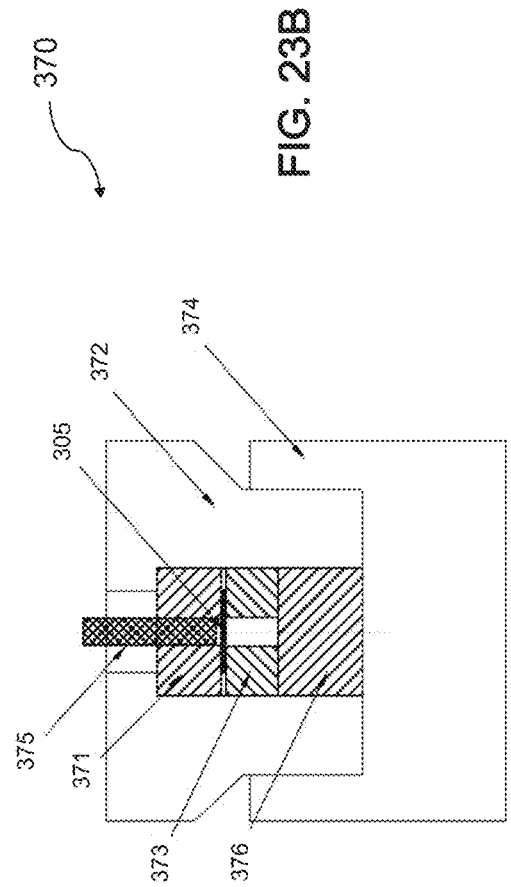

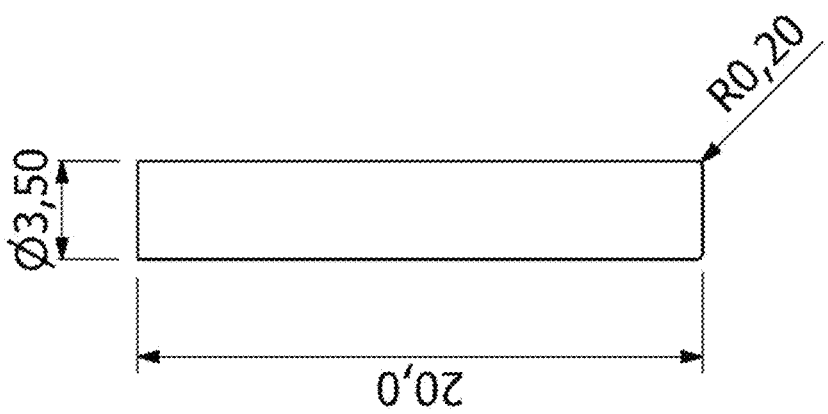
Prior Art

APPARATUS AND METHOD FOR FILLET PUNCH CREEP TESTING

TECHNICAL FIELD

The present disclosure relates generally to creep testing and, more particularly, to evaluating creep properties of small specimen by using miniaturized fillet punch creep testing.

BACKGROUND

Creep testing provides a powerful tool when evaluating a remaining life of in-service components of a system used in different industries, such as oil and gas, and power plants. Conventional creep testing machines are focused on predicting creep properties of a sample material based on standard tests. The most commonly used standard testing method is a conventional Uniaxial Creep Test, which not only requires a large amount of sample material, but also involves a destructive and time-consuming process; thus, it cannot be used to predict the remaining life of in-service parts of a system. As such, a considerable research and development has been done in recent years to improve current creep testing methods.

Recent development has offered a significant promise to establish miniaturized testing methods that require a small amount of sample material to predict creep properties. Some of the most popular miniaturized creep testing techniques include Indentation Creep Test, Impression Creep Test, Shear Punch Creep Test, and Small Punch Creep Test. Despite their powerful tools for evaluating creep characteristics of materials, these methods reveal some problems and limitations. For example, based on the spherical or pyramidal shape of the indenter in the Indentation Creep Test, the contact area with the specimen increases over time, and thus, the stress level decreases, which makes it difficult to control such contact stress, and leads to higher stress concentration. Even though the cylindrical indenter shape in the Compression Creep Test resolves such issue, both indentation methods still rely on compressive forces for testing, which ultimately cannot provide a third stage of a creep curve for analysis. Similarly, the sharp edges in the cylindrical punch and in the die of the Shear Punch Creep Test result in high stress concentration on the contact area and high dispersion in the measured data making it questionable to repeat the creep testing to produce a reliable creep curve. Nonetheless, a first stage of the creep curve cannot also be determined using the Shear Punch Creep Test. Likewise, while the spherical shape punch in the Small Punch Creep Test reduces the amount of dispersion in the measured data, local failures can still occur. Also, the contact area of the punch in the Small Punch Creep Test increases over time, as does the amount of applied stress on the specimen, which ultimately leads to difficulty in controlling the applied stress. Moreover, the changing geometry in the specimen during such creep testing method must be taken into consideration for data analysis.

Finally, to interpret the results of all these miniaturized testing methods, it is necessary to obtain a relationship between an applied force in a miniaturized testing machine and stresses in the standard creep testing machine. As such, this data transformation can always encounter difficulty when using these miniaturized testing techniques. Therefore, the entire process can lead to increase in testing time and labor intensity, and thus cost inefficiency. Due to all these shortcomings, there remains a need to develop an improved miniaturized process to obtain creep testing measurements with higher stability and reliability while being timely and cost effective.

Accordingly, the present disclosure addresses providing an improved apparatus and method of miniaturized creep testing method using a Fillet Punch Creep Test, while offering a non-destructive and time efficient process.

SUMMARY

In one general aspect, described is an improved apparatus configured for fillet punch creep testing on a specimen. In one implementation, the apparatus for fillet punch creep testing may comprise a structural support unit and a testing unit. The testing unit can be secured to a top end and a bottom end of the structural support unit, and can be configured to conduct creep testing on a specimen. The structural support unit can include an upper plate, a lower plate, a plurality of columns, a plurality of column supports, a top quartz pipe, a bottom quartz pipe, and a plurality of quartz supports. Each column can extend between the upper and lower plates, and can be connected to such plates by a corresponding one of the column supports. The top and bottom quartz pipes can be connected respectively from one end to the upper and lower plates by a corresponding one of the quartz supports.

In an aspect, the testing unit can include a loading unit, a fillet punch unit, a thermal unit, and a measuring unit. The loading unit can include a loading weight, a loading rod, and a supporting rod, and can be secured to the structural support unit, and can apply load to the specimen. The thermal unit may surround the fillet punch unit and be secured to a holder unit, and can be configured to heat the specimen. The measuring unit can be in contact with the fillet punch unit, and can be configured to monitor and measure displacement, and to produce a creep curve.

In a related aspect, the fillet punch unit may include an upper die, an upper die holder, a filleted lower die, a lower die holder, and a filleted punch in which the specimen can be clamped between the upper die and the filleted lower die. A top end of the upper die may extend to the top end of the fillet punch unit, and a bottom end of the upper die may in contact with a top end of the filleted lower die, and the upper die may be secured to the upper die holder. A bottom end of the filleted lower die may extend to the bottom end of the fillet punch unit, and the filleted lower die may be secured to the lower die holder. A top end of the filleted punch may be in contact with the bottom end of the loading rod, and a bottom end of the filleted punch may be in contact with the specimen to transfer the applied load from the loading unit to the specimen.

In a further aspect, filleted edges in the filleted lower die and the filleted punch can eliminate stress concentration in the specimen resulting in stable measurements, and thus, reducing the number of tests required for reliable results. The specimen can also include a small amount with no constraint in thickness and no need for special specimen preparation, which can result in a non-destructive and less time-consuming process to produce different stages of the creep curve during creep testing. The loading weight can also apply a constant load from the loading rod to the filleted punch, and subsequently to the specimen, which in turn can prevent dispersion in the measured data, and can make the fillet punch creep testing to be done repeatedly in order to predict a remaining life of in-service parts of a system.

In another general aspect, described is an improved method of fillet punch creep testing. In one implementation, the method of fillet punch creep testing may include the steps of loading a specimen into a fillet punch unit, and the fillet punch unit may be secured to a structural support unit, and can include an upper die, an upper die holder, a filleted lower die, a lower die holder, and a filleted punch. The specimen can be in contact with a bottom end of the filleted punch, and can be clamped between the upper die and the filleted lower die, and the combination of which can be secured to the surrounding upper and lower die holders.

In an aspect, the method of fillet punch creep testing may also include applying load to the specimen by a loading unit in which the loading unit may be secured to the structural support unit, and can include a loading weight, a loading rod, and a supporting rod. The loading rod can be arranged to transfer the applied load from the loading weight to a top end of the filleted punch down to the specimen.

In a related aspect, the method of fillet punch creep testing may also include heating the specimen by a furnace in which the furnace may surround the fillet punch unit and can be secured to a holder unit. The method of fillet punch creep testing can further include controlling temperature of the specimen by a furnace controller in which the furnace controller can be in contact with a thermocouple inside the furnace.

In a further aspect, the method of fillet punch creep testing may also include measuring displacement of the specimen by a motion sensor in which the motion sensor can be in contact with the loading rod. The method of fillet punch creep testing can further include producing a creep curve for the specimen by analyzing the displacement data, which can be transferred in real-time to a data storage unit.

The foregoing and other objects, features, aspects, and advantages of the present invention will become more apparent from the following detailed description of the present application when taken in conjunction with the accompanying drawings.

BRIEF DESCRIPTION OF THE DRAWINGS

Features of the subject technology are set forth in the appended claims. However, for purpose of explanation, several implementations of the subject technology are set forth in the following figures.

FIG. 3A through FIG. 3C are exemplary schematic drawings of an upper plate of an improved fillet punch creep testing machine, in an aspect of providing an improved method for miniaturized creep testing, in accordance with one or more implementations.

FIG. 14A through FIG. 14C are exemplary schematic drawings of a filleted lower die of a fillet punch creep testing machine, in an aspect of providing a method for miniaturized creep testing, in accordance with one or more implementations.

FIG. 15A through FIG. 15C are exemplary schematic drawings of a filleted lower die of an improved fillet punch creep testing machine, in an aspect of providing an improved method for miniaturized creep testing, in accordance with one or more implementations.

FIG. 16A through FIG. 16C are exemplary schematic drawings of a lower die holder of an improved fillet punch creep testing machine, in an aspect of providing an improved method for miniaturized creep testing, in accordance with one or more implementations.

FIG. 19A through FIG. 19C are exemplary schematic drawings of a filleted punch of an improved fillet punch creep testing machine, in an aspect of providing an improved method for miniaturized creep testing, in accordance with one or more implementations.

FIG. 20A through FIG. 20C are exemplary schematic drawings of a furnace of a thermal unit of an improved fillet punch creep testing machine, in an aspect of providing an improved method for miniaturized creep testing, in accordance with one or more implementations.

FIG. 21A through FIG. 21C are exemplary schematic drawings of a specimen of an improved fillet punch creep testing machine, in an aspect of providing an improved method for miniaturized creep testing, in accordance with one or more implementations.

FIG. 23A and FIG. 23B are exemplary schematic drawings of a conventional prior art creep testing machine configured for miniaturized creep testing.

FIG. 27A through FIG. 27C are exemplary schematic drawings of a filleted punch of a conventional prior art creep testing machine configured for miniaturized creep testing.

DETAILED DESCRIPTION

Figure 1A:
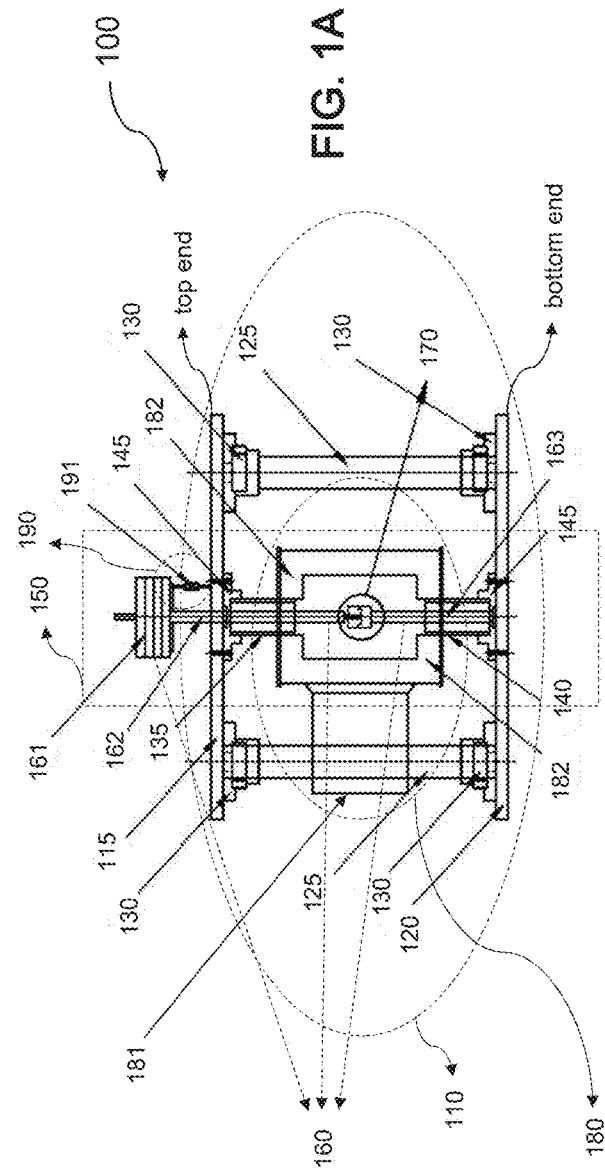
FIG. 1A and FIG. 1B are exemplary schematic drawings of a fillet punch creep testing machine configured for miniaturized creep testing.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

A solution is proposed herein to resolve the above-motioned issues and others by providing an improved apparatus and method of fillet punch creep testing. Principles of the present invention will now be described in detail with reference to the examples illustrated in the accompanying drawings and discussed below. FIG. 23A illustrates an exemplary miniaturized creep testing machine 300 (hereinafter "system 300") depicting prior art. System 300 includes a structural support unit 310 and a testing unit 350. The testing unit 350 extends between a top end and a bottom end of the structural support unit 310, and is configured to conduct creep testing on a specimen 305. The structural support unit 310 includes an upper plate 315, a lower plate 320, a plurality of columns 325, a plurality of column supports 330, a top quartz pipe 335, a bottom quartz pipe 340, and a plurality of quartz supports 345. Each column 325 extends between the upper and lower plates, 315 and 320, and is connected to such plates by a corresponding one of the column supports 325. The top and bottom quartz pipes, 335 and 340, are connected respectively from one end to the upper and lower plates, 315 and 320, by a corresponding one of the quartz supports 345.

In one implementation, the testing unit 350 includes a loading unit 360, a fillet punch unit 370, a thermal unit 380 and a measuring unit 390. The loading unit 360 includes a loading weight 361, a loading rod 362, a supporting rod 363 and a loading lever 364, and is secured to the structural support unit 310 and arranged to apply lever loading to the specimen 305. The thermal unit 380 surrounds the fillet punch unit 370 and is secured to a holder unit 381, and configured to heat the specimen 305. The measuring unit 390 is in contact with the fillet punch unit 370, and is configured to monitor and measure displacement, and to produce a creep curve.

FIG. 23B illustrates an exemplary fillet punch unit 370 that is arranged to secure the specimen 305, and to transfer the applied load from the loading unit 360 to such specimen. The fillet punch unit 370 includes an upper die 371, an upper die holder 372, a filleted lower die 373, a lower die holder 374, a filleted punch 375 and a holder rod 376 in which the specimen 305 is clamped between the upper die 371 and the filleted lower die 373. A top end of the upper die 371 extends to the top end of the fillet punch unit 370, and a bottom end of the upper die 371 is in contact with a top end of the filleted lower die 373, and the upper die 371 is secured to the upper die holder 372. A bottom end of the filleted lower die 373 extends to the bottom end of the fillet punch unit 370, the filleted lower die 371 is secured to the lower die holder 374 and the holder rod 376. A top end of the filleted punch 375 is in contact with the bottom end of the loading rod 362, and a bottom end of the filleted punch 375 is in contact with the specimen 305 to transfer the applied load.

To apply constant loading via a direct loading mechanism instead of the lever loading mechanism used in the prior art system 300, a fillet punch creep testing machine is described herein. FIG. 1A illustrates an exemplary miniaturized creep testing machine 100 (hereinafter "system 100") depicting a fillet punch creep testing machine that can be configured to use a direct loading mechanism during creep testing. In this exemplary embodiment, system 100 may include a structural support unit 110 and a testing unit 150. In one implementation, the testing unit 150 can extend between a top end and a bottom end of the structural support unit 110, and can be configured to conduct creep testing on a specimen 105. The structural support unit 110 can include an upper plate 115, a lower plate 120, a plurality of columns 125, a plurality of column supports 130, a top quartz pipe 135, a bottom quartz pipe 140, and a plurality of quartz supports 145. Each column 125 can extend between the upper and lower plates, 115 and 120, and can be connected to such plates by a corresponding one of the column supports 125. The top and bottom quartz pipes, 135 and 140, can be connected respectively from one end to the upper and lower plates, 115 and 120, by a corresponding one of the quartz supports 145.

In one implementation, the testing unit 150 can include a loading unit 160, a fillet punch unit 170, a thermal unit 180 and a measuring unit 190. The loading unit 160 can include a loading weight 161, a loading rod 162 and a supporting rod 163, and can be secured to the structural support unit 110 and arranged to apply direct loading to the specimen 105. The thermal unit 180 may surround the fillet punch unit 170 and be secured to a holder unit 181, and can be configured to heat the specimen 105. The measuring unit 190 can be in contact with the fillet punch unit 170, and can be configured to monitor and measure displacement, and to produce a creep curve.

Figure 1B:
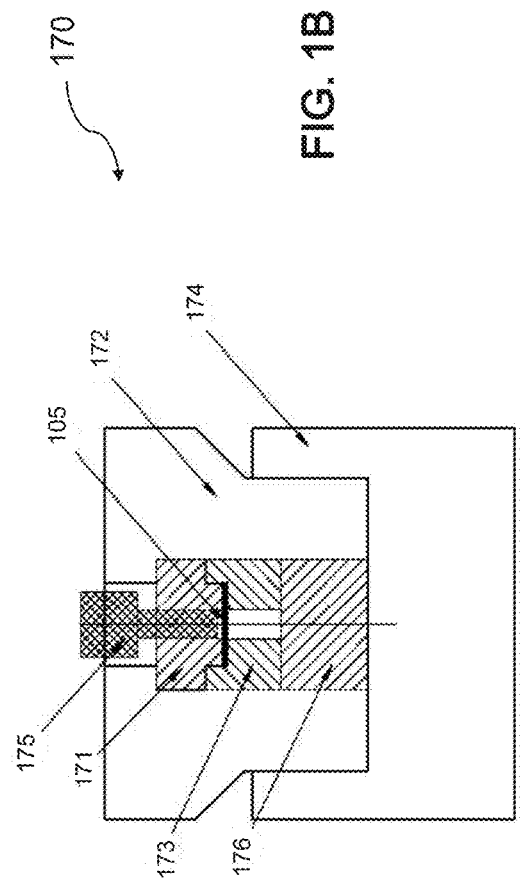

FIG. 1B illustrates an exemplary fillet punch unit 170 that can be arranged to secure the specimen 105, and to transfer the applied load from the loading unit 160 to such specimen. In this exemplary embodiment, the fillet punch unit 170 may include an upper die 171, an upper die holder 172, a filleted lower die 173, a lower die holder 174, a filleted punch 175 and a holder rod 176 in which the specimen 105 can be clamped between the upper die 171 and the filleted lower die 173. In one implementation, a top end of the upper die 171 may extend to the top end of the filleted punch unit 170, and a bottom end of the upper die 171 may be in contact with a top end of the filleted lower die 173, and the upper die 171 may be secured to the upper die holder 172. A bottom end of the filleted lower die 173 may extend to the bottom end of the fillet punch unit 170, the filleted lower die 171 may be secured to the lower die holder 174 and the holder rod 176. A top end of the filleted punch 175 may be in contact with the bottom end of the loading rod 162, and a bottom end of the filleted punch 175 may be in contact with the specimen 105 to transfer the applied load.

Figure 2A:
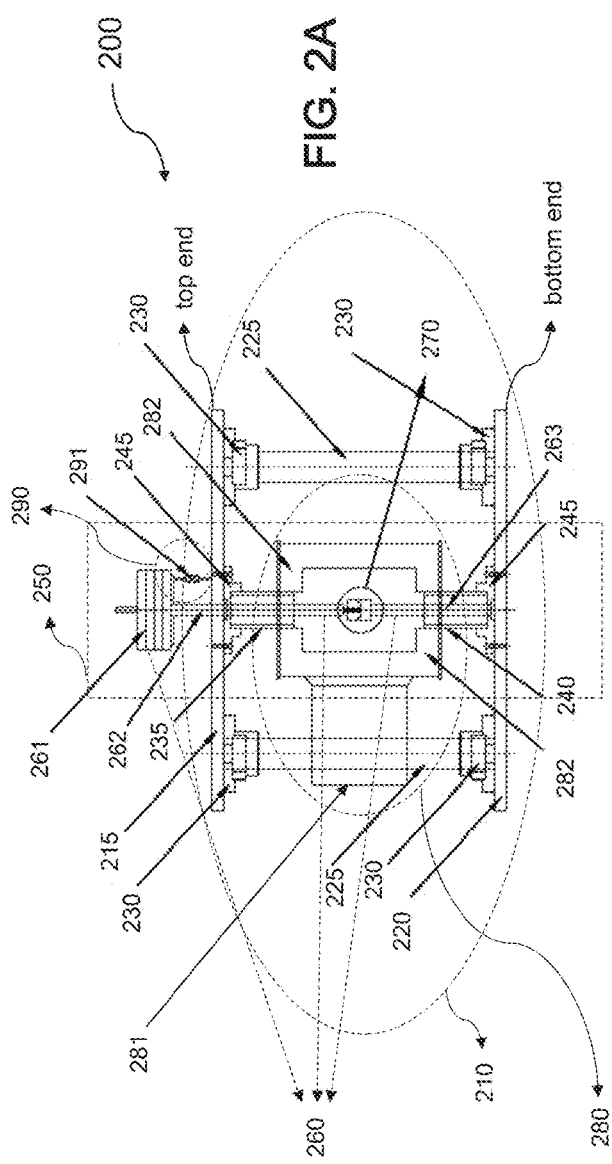
FIG. 2A and FIG. 2B are exemplary schematic drawings of an improved fillet punch creep testing machine, in an aspect of providing an improved method for miniaturized creep testing, in accordance with one or more implementations.

To apply constant loading via a direct loading mechanism as well as to minimize stress concentration against the specimen and to increase stability in the experimental results during miniaturized creep testing, an improved fillet punch creep testing machine and process, in accordance with aspects of the invention, is described herein. FIG. 2A illustrates an exemplary improved apparatus and method of fillet punch creep testing machine that can be configured to conduct creep testing on a small sample material with no need to constrain the thickness of such sample. In this exemplary embodiment, the improved fillet punch creep testing machine 200 (hereinafter "system 200") may include a structural support unit 210 and a testing unit 250. In one implementation, the testing unit 250 as shown can extend between a top end and a bottom end of the structural support unit 210, and can be configured to conduct creep testing on a specimen 205. The structural support unit 210 can include an upper plate 215, a lower plate 220, a plurality of columns 225, a plurality of column supports 230, a top quartz pipe 235, a bottom quartz pipe 240, and a plurality of quartz supports 245. Each column 225 can extend between the upper and lower plates, 215 and 220, and can be connected to such plates by a corresponding one of the column supports 225. The top and bottom quartz pipes, 235 and 240, can be connected respectively from one end to the upper and lower plates, 215 and 220, by a corresponding one of the quartz supports 245.

In one implementation, the testing unit 250 can include a loading unit 260, a fillet punch unit 270, a thermal unit 280 and a measuring unit 290. The loading unit 260 can include a loading weight 261, a loading rod 262 and a supporting rod 263, and can be secured to the structural support unit 210 and arranged to apply direct loading to the specimen 205. The thermal unit 280 may surround the fillet punch unit 270 and be secured to a holder unit 281, and can be configured to heat the specimen 205. The measuring unit 290 can be in contact with the fillet punch unit 270 through the loading rod 262, and can be configured to monitor and measure displacement, and to produce a creep curve.

Figure 2B:
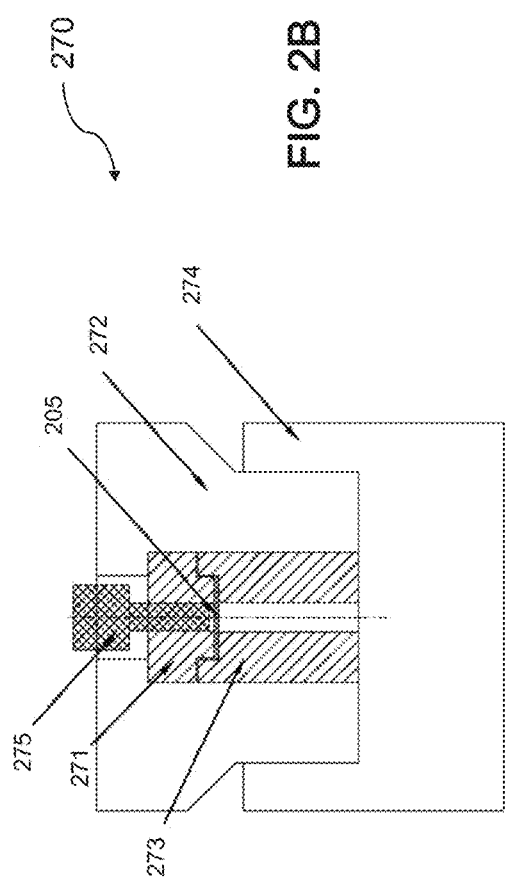

FIG. 2B illustrates an exemplary fillet punch unit 270 that can be arranged to secure the specimen 205, and to transfer the applied load from the loading unit 260 to such specimen. In this exemplary embodiment, the fillet punch unit 270 may include an upper die 271, an upper die holder 272, a filleted lower die 273, a lower die holder 274 and a filleted punch 275 in which the specimen 205 can be clamped between the upper die 271 and the filleted lower die 273. In one implementation, a top end of the upper die 271 may extend to the top end of the fillet punch unit 270, and a bottom end of the upper die 271 may be in contact with a top end of the filleted lower die 273, and the upper die 271 may be secured to the upper die holder 272. A bottom end of the filleted lower die 273 may extend to the bottom end of the fillet punch unit 270, the filleted lower die 271 may be secured to the lower die holder 274. A top end of the filleted punch 275 may be in contact with the bottom end of the loading rod 262, and a bottom end of the filleted punch 275 may be in contact with the specimen 205 to transfer the applied load.

FIG. 3A through FIG. 3C are exemplary schematic drawings of the upper plate 215 that can be configured to provide support to the top end of the structural support unit 210. In this exemplary embodiment, FIG. 3A through FIG. 3C respectively illustrate a perspective view, a side view, and a top view of the upper plate 215. In one implementation, the upper plate 215 may include a central opening 215A, a plurality of central connections 215B, and a plurality of peripheral connections 215C. The central opening 215A may be arranged to allow the loading rod 262 to move through the top end of the structural support unit 210. Each central connection 215B can be configured to connect the upper plate 215 to a top end of the top quartz pipe 235, and each peripheral connection 215C can be configured to connect the upper plate 215 to a top end of one of the corresponding columns 225 by the corresponding column supports 230. As one example, specific dimensions for the components of the upper plate 215 are shown in FIG. 3A through FIG. 3C.

Figure 4A:
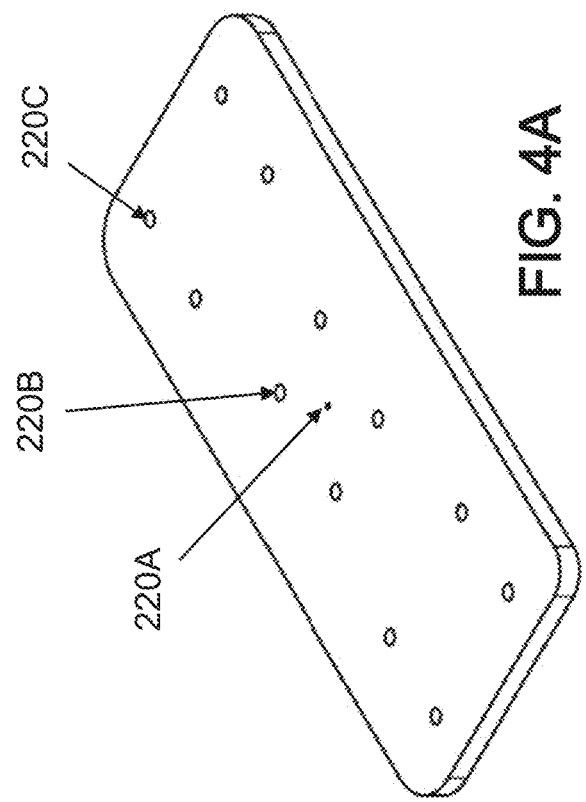
FIG. 4A through FIG. 4C are exemplary schematic drawings of a lower plate of an improved fillet punch creep testing machine, in an aspect of providing an improved method for miniaturized creep testing, in accordance with one or more implementations.
Figure 4B:
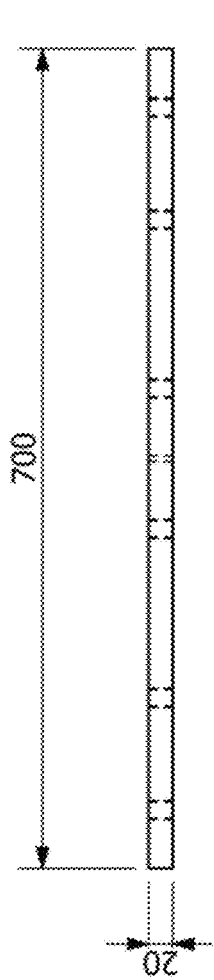
Figure 4C:
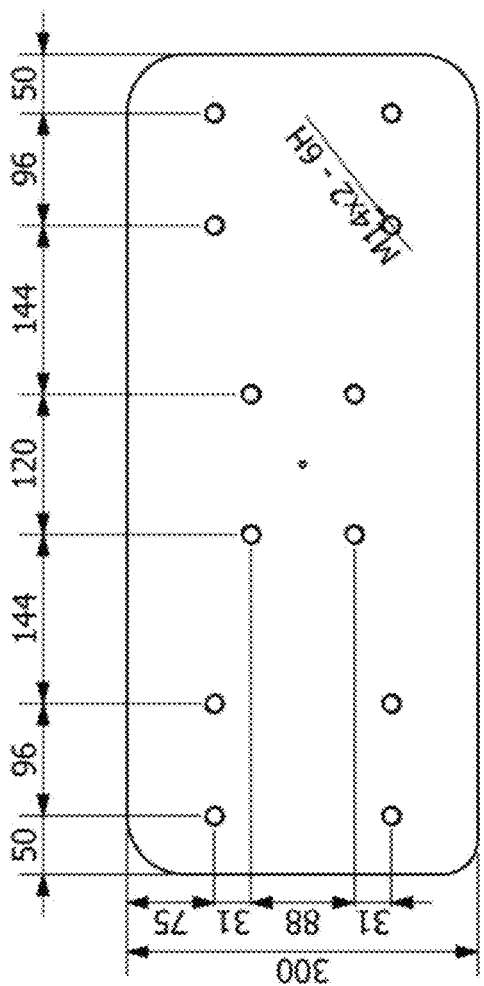

FIG. 4A through FIG. 4C are exemplary schematic drawings of the lower plate 220 that can be configured to provide support to the bottom end of the structural support unit 210. In this exemplary embodiment, FIG. 4A through FIG. 4C respectively illustrate a perspective view, a side view, and a top view of the lower plate 220. In one implementation, the lower plate 220 may include a central opening 220A, a plurality of central connections 220B, and a plurality of peripheral connections 220C. The central opening 220A may be arranged to secure the supporting rod 263 to the bottom end of the structural support unit 210. Each central connection 220B can be configured to connect the lower plate 220 to a bottom end of the bottom quartz pipe 240, and each peripheral connection 220C can be configured to connect the lower plate 220 to a bottom end of one of the corresponding columns 225 by the corresponding column supports 230. As one example, specific dimensions for the components of the lower plate 220 are shown in FIG. 4A through FIG. 4C.

Figure 5A:
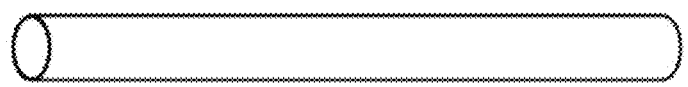
FIG. 5A through FIG. 5C are exemplary schematic drawings of a column of an improved fillet punch creep testing machine, in an aspect of providing an improved method for miniaturized creep testing, in accordance with one or more implementations.
Figure 5B:
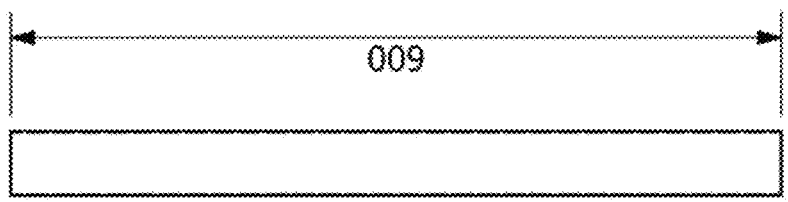
Figure 5C:
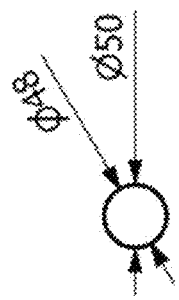

FIG. 5A through FIG. 5C are exemplary schematic drawings of each column 225 that can be configured to provide lateral support to the structural support unit 210. In this exemplary embodiment, FIG. 5A through FIG. 5C respectively illustrate a perspective view, a side view, and a top view of the column 225. In one implementation, each column 225 may be arranged to connect the upper and lower plates, 215 and 220, together. As one example, specific dimensions for the components of each column 225 are shown in FIG. 5A through FIG. 5C.

Figure 6A:
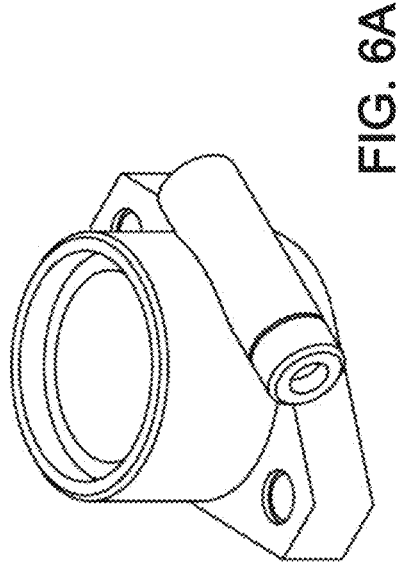
FIG. 6A through FIG. 6C are exemplary schematic drawings of a column support of an improved fillet punch creep testing machine, in an aspect of providing an improved method for miniaturized creep testing, in accordance with one or more implementations.
Figure 6B:
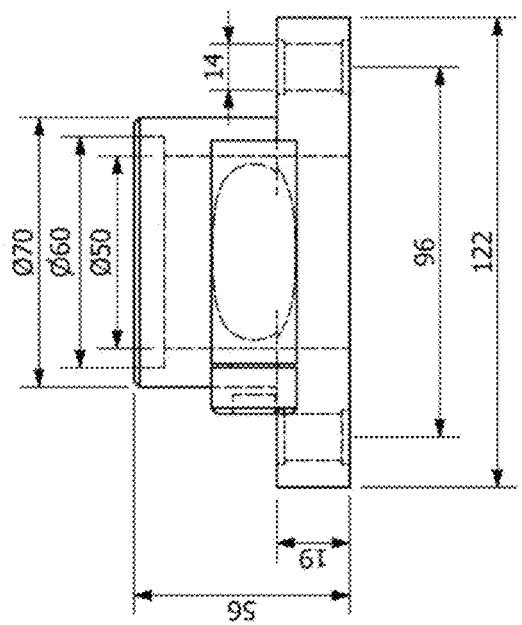
Figure 6C:
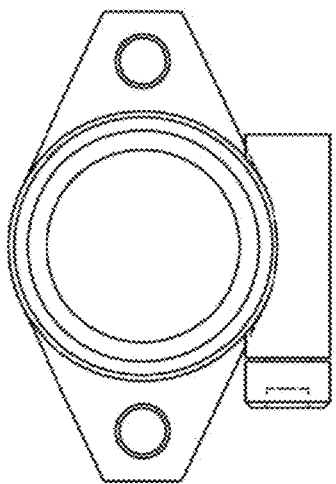

FIG. 6A through FIG. 6C are exemplary schematic drawings of each column support 230 that can be configured to connect each column 225 to the structural support unit 210. In this exemplary embodiment, FIG. 6A through FIG. 6C respectively illustrate a perspective view, a side view, and a top view of the column support 230. In one implementation, each column support 230 may be arranged to connect the upper and lower plates, 215 and 220, to one of the corresponding column 225. As one example, specific dimensions for the components of each column support 230 are shown in FIG. 6A through FIG. 6C.

Figure 7A:
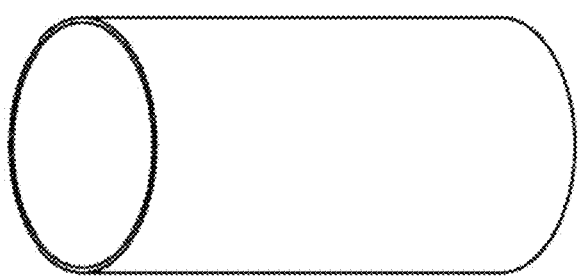
FIG. 7A through FIG. 7C are exemplary schematic drawings of a top/bottom quartz pipe of an improved fillet punch creep testing machine, in an aspect of providing an improved method for miniaturized creep testing, in accordance with one or more implementations.
Figure 7B:
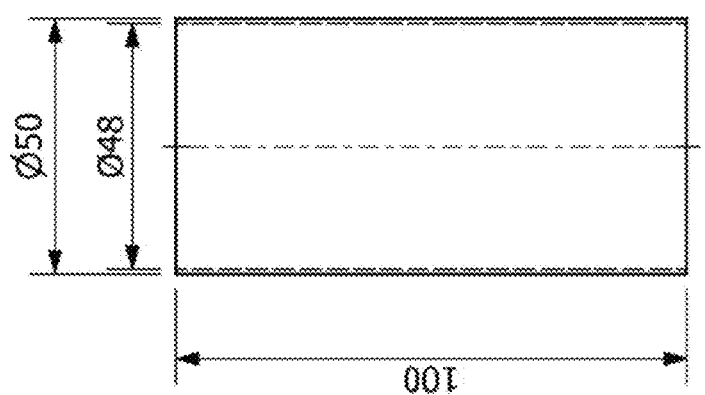
Figure 7C:
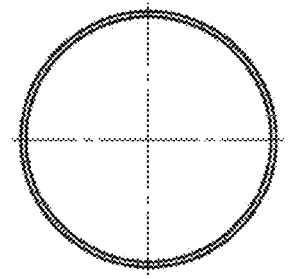

FIG. 7A through FIG. 7C are exemplary schematic drawings of the top and bottom quartz pipes, 235 and 240, that can be configured to provide support respectively to the loading and supporting rods, 262 and 263. In this exemplary embodiment, FIG. 7A through FIG. 7C respectively illustrate a perspective view, a side view, and a top view of the top and bottom quartz pipes, 235 and 240. In one implementation, the top and bottom quartz pipes, 235 and 240, may be made of quartz glass to eliminate atmospheric contact with the loading and supporting rods, 262 and 263. As one example, specific dimensions for the components of the top and bottom quartz pipes, 235 and 240, are shown in FIG. 7A through FIG. 7C.

Figure 8A:
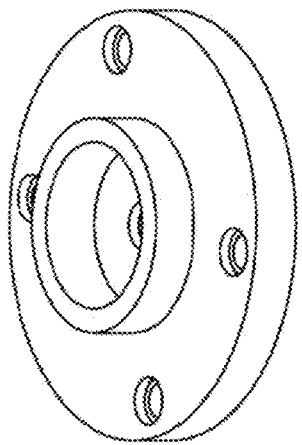
FIG. 8A through FIG. 8C are exemplary schematic drawings of quartz support of an improved fillet punch creep testing machine, in an aspect of providing an improved method for miniaturized creep testing, in accordance with one or more implementations.
Figure 8B:
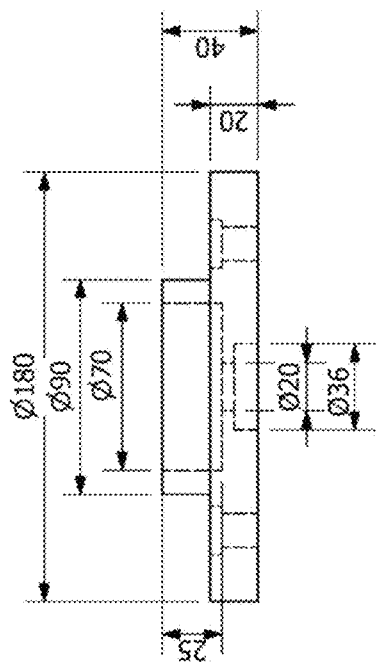
Figure 8C:
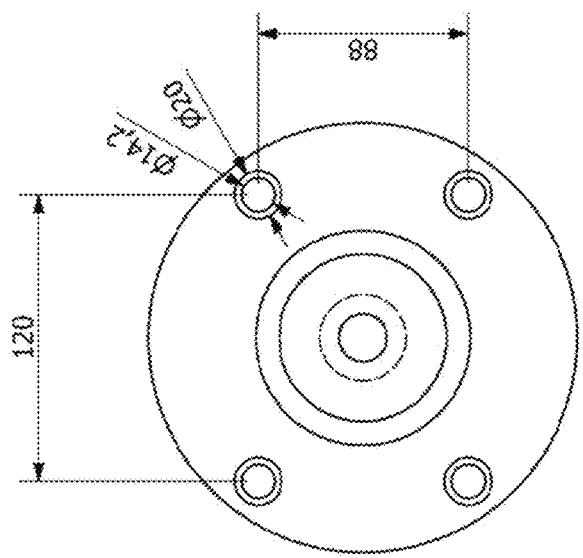

FIG. 8A through FIG. 8C are exemplary schematic drawings of each quartz support 245 that can be configured to connect the top and bottom quartz pipes, 235 and 240, to the structural support unit 210. In this exemplary embodiment, FIG. 8A through FIG. 8C respectively illustrate a perspective view, a side view, and a top view of the quartz support 245. In one implementation, each quartz support 245 may be arranged to connect the upper and lower plates, 215 and 220, respectively to the top and bottom quartz pipes, 235 and 240. As one example, specific dimensions for the components of each quartz support 245 are shown in FIG. 8A through FIG. 8C.

Figure 24A:
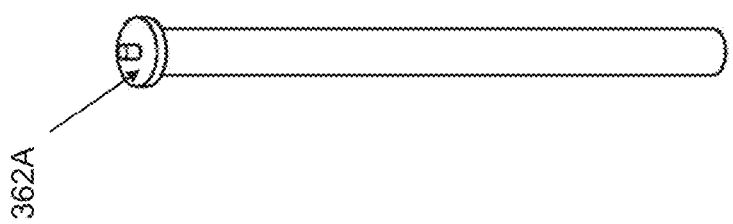
FIG. 24A through FIG. 24C are exemplary schematic drawings of a loading rod of a conventional prior art creep testing machine configured for miniaturized creep testing.
Figure 24B:
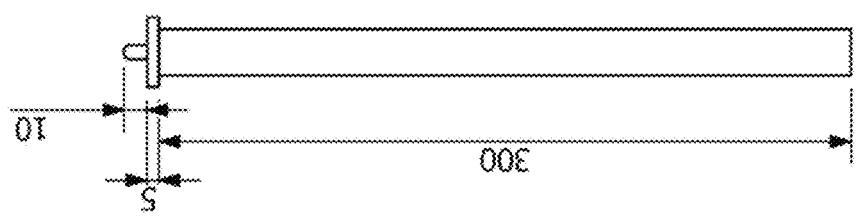
Figure 24C:
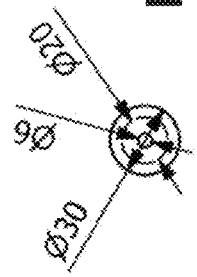

FIG. 24A through FIG. 24C are exemplary schematic drawings of the loading rod 362 in the prior art system 300 that is configured to transfer applied load to the specimen 305. In this exemplary embodiment, FIG. 24A through FIG. 24C respectively illustrate a perspective view, a side view, and a top view of the loading rod 362. In one implementation, a top end of the loading rod 362 is in contact with the loading lever 364, and a bottom end of the loading rod 362 in contact with a top end of the fillet punch unit 370, and the loading rod 362 is surrounded by the top quartz pipe 335. The loading rod 362 has a cylindrical shape, and includes a bearing connection 362A, which secures the loading rod 362 to the upper plate 315, and eliminates resistance force at such connection. As one example, specific dimensions for the components of the loading rod 362 are shown in FIG. 24A through FIG. 24C.

Figure 9A:
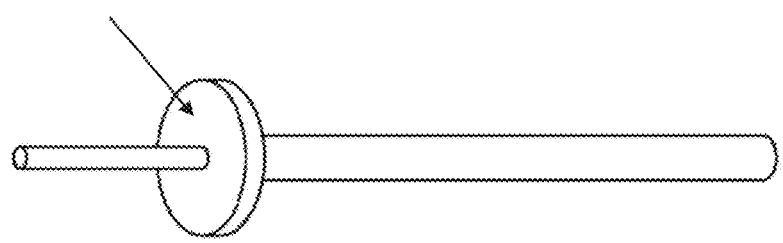
FIG. 9A through FIG. 9C are exemplary schematic drawings of a loading rod of a fillet punch creep testing machine as well as a loading rod of an improved fillet punch creep testing machine, in an aspect of providing an improved method for miniaturized creep testing, in accordance with one or more implementations.
Figure 9B:
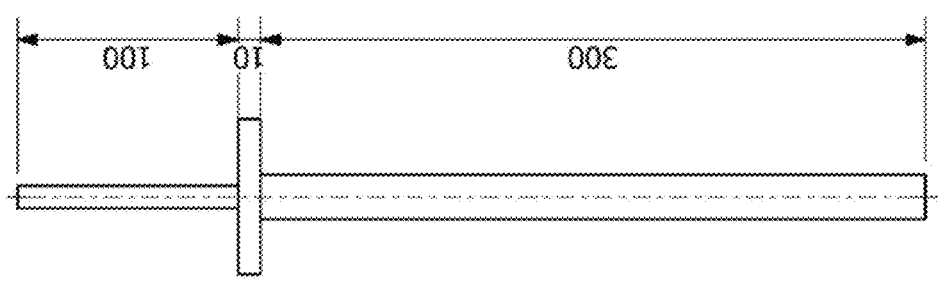
Figure 9C:
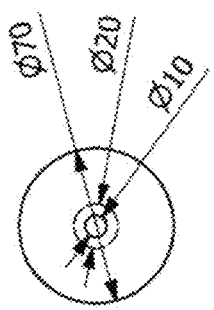

FIG. 9A through FIG. 9C are exemplary schematic drawings of the loading rods, 162 and 262, in the system 100 as well as in the improved system 200 that can be configured to transfer applied load to the specimens, 105 and 205. In this exemplary embodiment, FIG. 9A through FIG. 9C respectively illustrate a perspective view, a side view, and a top view of the loading rod 262. In one implementation, a top end of the loading rods 262 may be connected to a bottom end of the loading weight 261, and a bottom end of the loading rod 262 may be in contact with a top end of the fillet punch unit 270, and the loading rod 262 may be surrounded by the top quartz pipe 235. The loading rod 262 may be of a cylindrical shape, and can include a bearing connection 262A, which can move freely to secure the loading rod 262 to the upper plate 215, and to eliminate resistance force at such connection. In an aspect, the loading weight 261 can apply a constant load on the loading rod 262, which in turn can prevent dispersion in the testing results, and can allow creep testing to be repeated. As one example, specific dimensions for the components of the loading rod 262 are shown in FIG. 9A through FIG. 9C.

Figure 10A:
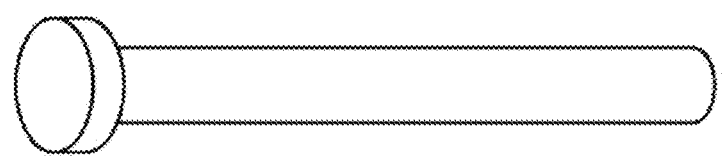
FIG. 10A through FIG. 10C are exemplary schematic drawings of a supporting rod of an improved fillet punch creep testing machine, in an aspect of providing an improved method for miniaturized creep testing, in accordance with one or more implementations.
Figure 10B:
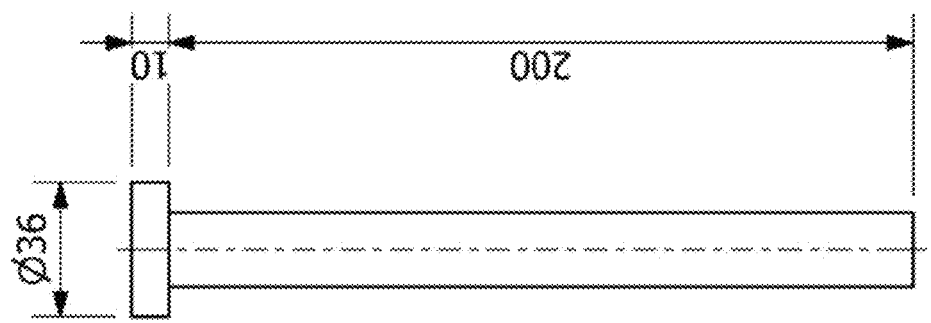
Figure 10C:
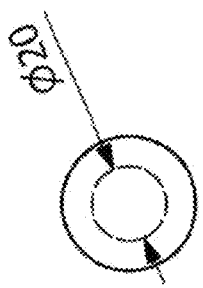

FIG. 10A through FIG. 10C are exemplary schematic drawings of the supporting rod 263 that can be configured to provide support to the fillet punch unit 270 and the surrounding thermal unit 280. In this exemplary embodiment, FIG. 10A through FIG. 10C respectively illustrate a perspective view, a side view, and a top view of the supporting rod 263. In one implementation, a top end of the supporting rod 263 may be connected to a bottom end of the fillet punch unit 270, and a bottom end of the supporting rod 263 may be connected to the lower plate 220, and the supporting rod 263 may be surrounded by the bottom quartz pipe 240. As one example, specific dimensions for the components of the supporting rod 263 are shown in FIG. 10A through FIG. 10C.

Figure 25A:
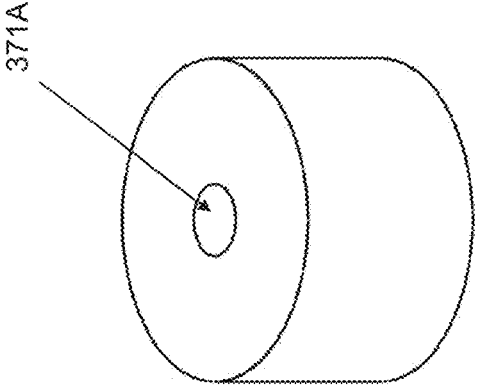
FIG. 25A through FIG. 25C are exemplary schematic drawings of an upper die of a conventional prior art creep testing machine configured for miniaturized creep testing.
Figure 25B:
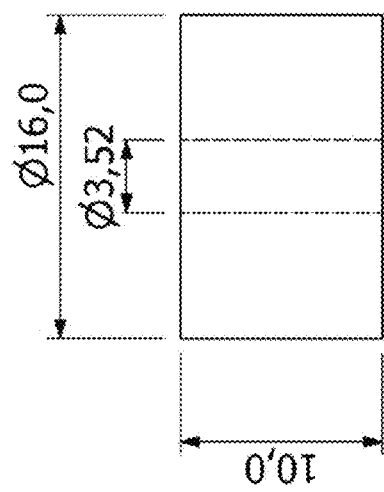
Figure 25C:
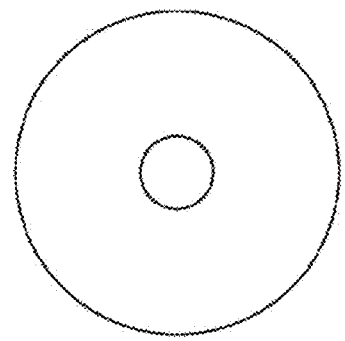

FIG. 25A through FIG. 25C are exemplary schematic drawings of the upper die 371 in the prior art system 300 that is configured to provide support to the clamped specimen 305. In this exemplary embodiment, FIG. 25A through FIG. 25C respectively illustrate a perspective view, a side view, and a top view of the upper die 371. In one implementation, the upper die 371 has a cylindrical shape, and includes a central opening 371A that has a diameter of, e.g., 3.52 mm to serve as a guideline for the filleted punch 375. As one example, specific dimensions for the components of the upper die 371 are shown in FIG. 25A through FIG. 25C.

Figure 11A:
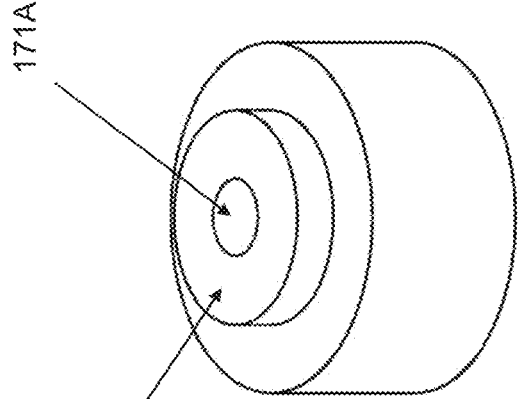
FIG. 11A through FIG. 11C are exemplary schematic drawings of an upper die of a fillet punch creep testing machine, in an aspect of providing a method for miniaturized creep testing, in accordance with one or more implementations.
Figure 11B:
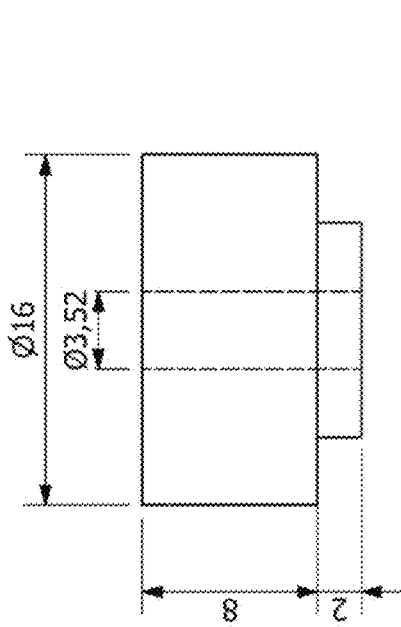
Figure 11C:
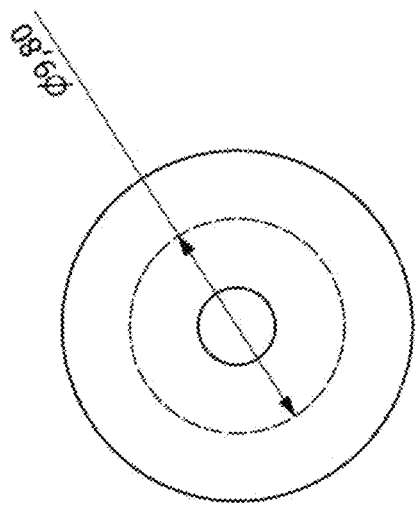

FIG. 11A through FIG. 11C are exemplary schematic drawings of the upper die 171 in the system 100 that can be configured to provide support to the clamped specimen 105. In this exemplary embodiment, FIG. 11A through FIG. 11C respectively illustrate a perspective view, a side view, and a top view of the upper die 171. In one implementation, the upper die 171 may be of a cylindrical shape, and can include a central opening 171A and a coaxial cylinder of different radii 171B in which the central opening 171A can have a diameter of, e.g., 3.52 mm to serve as a guideline for the punch 175. As one example, specific dimensions for the components of the upper die 171 are shown in FIG. 11A through FIG. 11C.

Figure 12A:
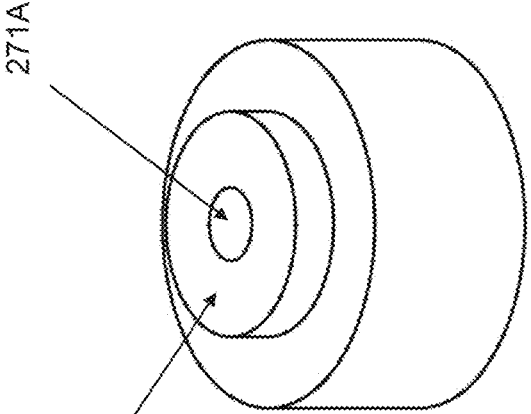
FIG. 12A through FIG. 12C are exemplary schematic drawings of an upper die of an improved fillet punch creep testing machine, in an aspect of providing an improved method for miniaturized creep testing, in accordance with one or more implementations.
Figure 12B:
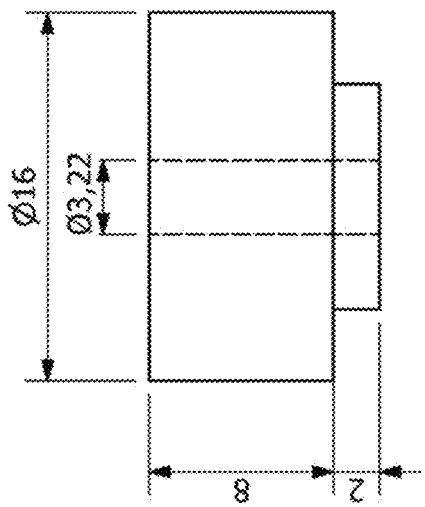
Figure 12C:
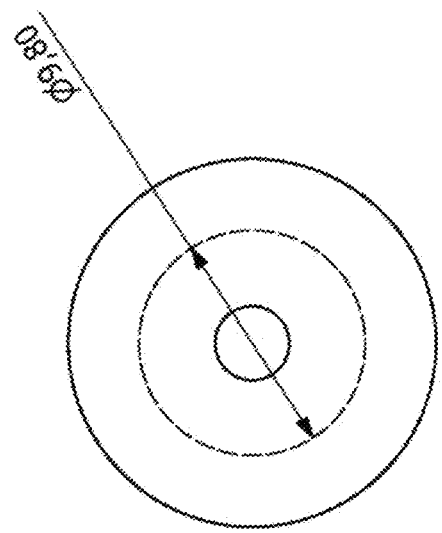

FIG. 12A through FIG. 12C are exemplary schematic drawings of the upper die 271 in the improved system 200 that can be configured to provide support to the clamped specimen 205. In this exemplary embodiment, FIG. 12A through FIG. 12C respectively illustrate a perspective view, a side view, and a top view of the upper die 271. In one implementation, the upper die 271 may be of a cylindrical shape, and can include a central opening 271A and a coaxial cylinder of different radii 271B in which the central opening 271A can have a diameter of, e.g., 3.22 mm to serve as a guideline for the filleted punch 275. In an aspect, the upper die 271 can be cut using a wire-cut machine with an accuracy of, e.g., 0.01 mm. As one example, specific dimensions for the components of the upper die 271 are shown in FIG. 12A through FIG. 12C.

Figure 13B:
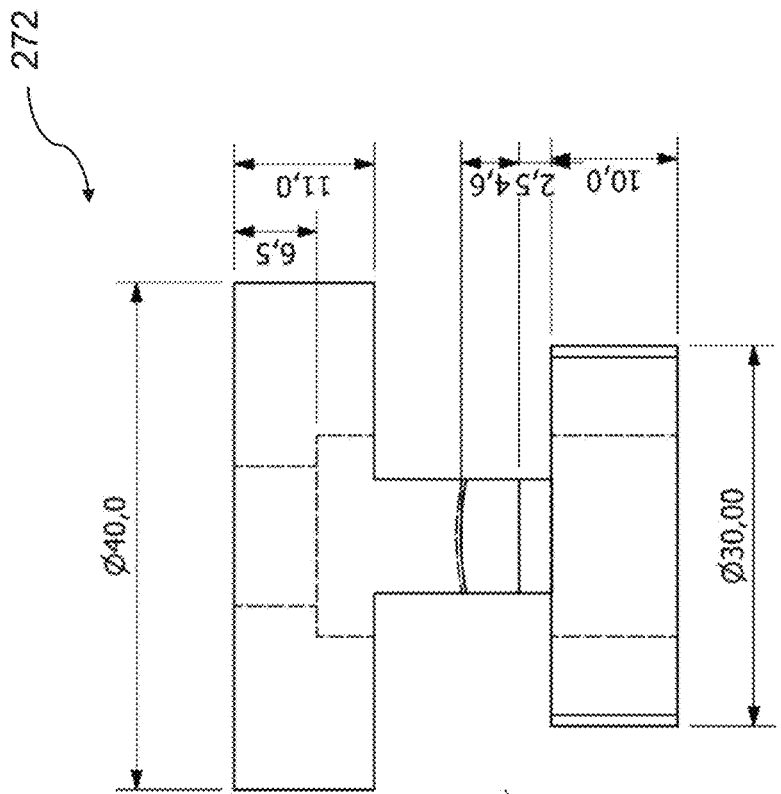
FIG. 13A through FIG. 13C are exemplary schematic drawings of an upper die holder of an improved fillet punch creep testing machine, in an aspect of providing an improved method for miniaturized creep testing, in accordance with one or more implementations.
Figure 13A:
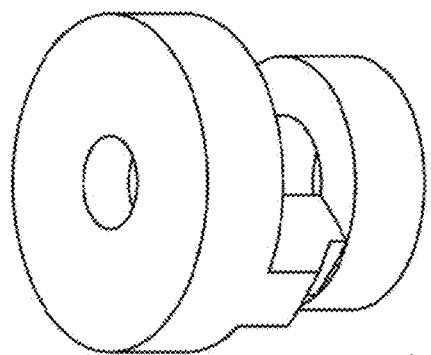
Figure 13C:
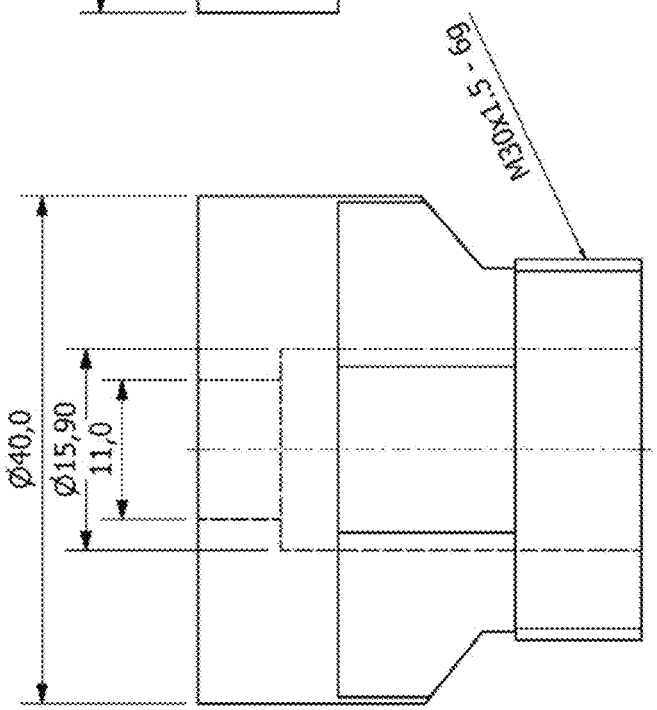

FIG. 13A through FIG. 13C are exemplary schematic drawings of the upper die holder 272 that can be configured to surround and secure the upper die 271. In this exemplary embodiment, FIG. 13A through FIG. 13C respectively illustrate a perspective view, a side view, and a top view of the upper die holder 272. As one example, specific dimensions for the components of the upper die holder 272 are shown in FIG. 13A through FIG. 13C.

Figure 26A:
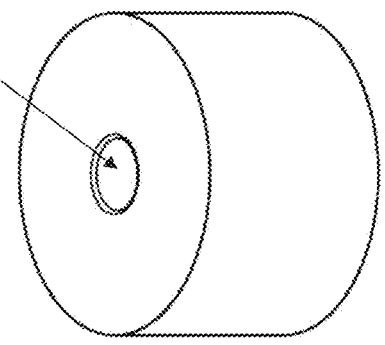
FIG. 26A through FIG. 26C are exemplary schematic drawings of a filleted lower die of a conventional prior art creep testing machine configured for miniaturized creep testing.
Figure 26B:
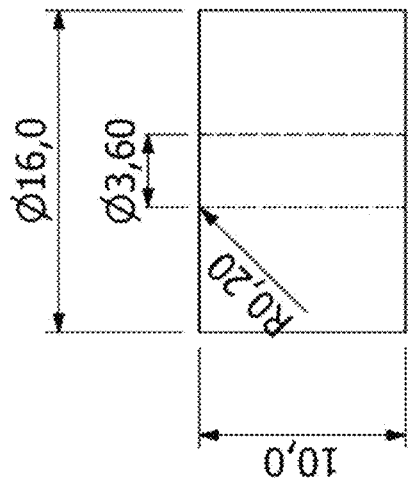
Figure 26C:
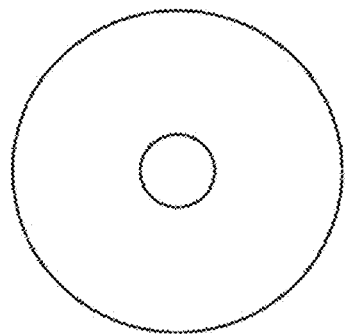

FIG. 26A through FIG. 26C are exemplary schematic drawings of the filleted lower die 373 in the prior art system 300 that is configured to provide support to the clamped specimen 305. In this exemplary embodiment, FIG. 26A through FIG. 26C respectively illustrate a perspective view, a side view, and a top view of the lower die 373. In one implementation, the lower die 373 has a cylindrical shape of, e.g., 10 mm in height, and includes a central opening 373A with a diameter of, e.g., 3.6 mm, and filleted edges of, e.g., 0.2 mm in radius. As one example, specific dimensions for the components of the lower die 373 are shown in FIG. 26A through FIG. 26C.

FIG. 14A through FIG. 14C are exemplary schematic drawings of the filleted lower die 173 in the system 100 that can be configured to provide support to the clamped specimen 105. In this exemplary embodiment, FIG. 14A through FIG. 14C respectively illustrate a perspective view, a side view, and a top view of the lower die 173. In one implementation, the lower die 173 may be of a cylindrical shape of, e.g., 10 mm in height, and can include a central opening 173A and a coaxial cylindrical recess 173B in which the central opening 173A may have a diameter of, e.g., 3.6 mm, and filleted edges of, e.g., 0.2 mm in radius. As one example, specific dimensions for the components of the lower die 173 are shown in FIG. 14A through FIG. 14C.

FIG. 15A through FIG. 15C are exemplary schematic drawings of the filleted lower die 273 in the improved system 200 that can be configured to provide support to the clamped specimen 205. In this exemplary embodiment, FIG. 15A through FIG. 15C respectively illustrate a perspective view, a side view, and a top view of the lower die 273. In one implementation, the filleted lower die 273 may be of a cylindrical shape of, e.g., 22 mm in height, and can include a central opening 273A and a coaxial cylindrical recess 273B in which the central opening 273A may have a diameter of, e.g., 3.25 mm, and filleted edges of, e.g., 0.1 mm in radius. The filleted edges of the filleted lower die 273 may eliminate stress concentration against the specimen 205 resulting in stable measurements, and thus, reducing an amount of required applied load during creep testing. In an aspect, the filleted lower die 273 can be cut using a wire-cut machine with an accuracy of, e.g., 0.01 mm. As one example, specific dimensions for the components of the filleted lower die 273 are shown in FIG. 15A through FIG. 15C.

FIG. 16A through FIG. 16C are exemplary schematic drawings of the lower die holder 274 that can be configured to surround and secure the filleted lower die 273. In this exemplary embodiment, FIG. 16A through FIG. 16C respectively illustrate a perspective view, a side view, and a top view of the lower die holder 274. As one example, specific dimensions for the components of the lower die holder 274 are shown in FIG. 16A through FIG. 16C.

Figure 17A:
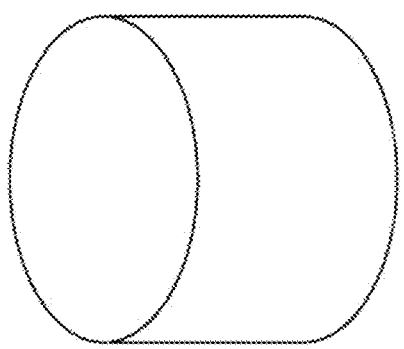
FIG. 17A through FIG. 17C are exemplary schematic drawings of a holder rod of conventional prior art creep testing machine as well as a loading rod of a fillet punch creep testing machine, in an aspect of providing a method for miniaturized creep testing, in accordance with one or more implementations.
Figure 17B:
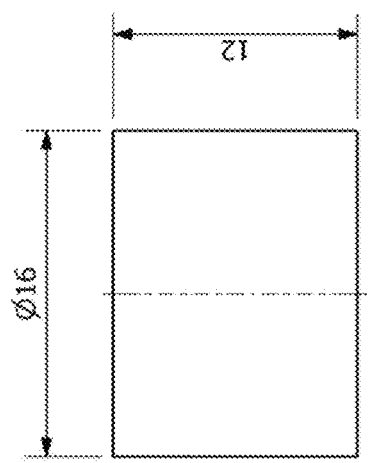
Figure 17C:
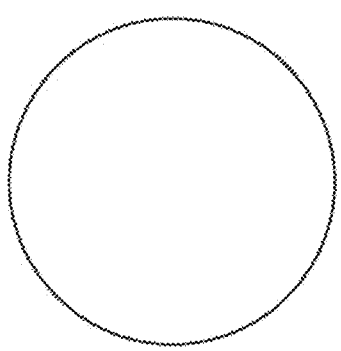

FIG. 17A through FIG. 17C are exemplary schematic drawings of the holder rods, 176 and 376, in the system 100 as well as in the prior art system 300 that can be configured to provide support to the lower die 173. In this exemplary embodiment, FIG. 17A through FIG. 17C respectively illustrate a perspective view, a side view, and a top view of the holder rod 176. As one example, specific dimensions for the components of the holder rod 176 are shown in FIG. 17A through FIG. 17C.

FIG. 27A through FIG. 27C are exemplary schematic drawings of the filleted punch 375 in the prior art system 300 that is configured to transfer the applied load from the loading rod 362 to the specimen 305. In this exemplary embodiment, FIG. 27A through FIG. 27C respectively illustrate a perspective view, a side view, and a top view of the punch 375. In one implementation, the punch 375 includes a cylinder shape with a diameter of, e.g., 3.5 mm, and filleted edges of, e.g., 0.2 mm in radius at a bottom end. As one example, specific dimensions for the components of the punch 375 are shown in FIG. 27A through FIG. 27C.

Figure 18A:
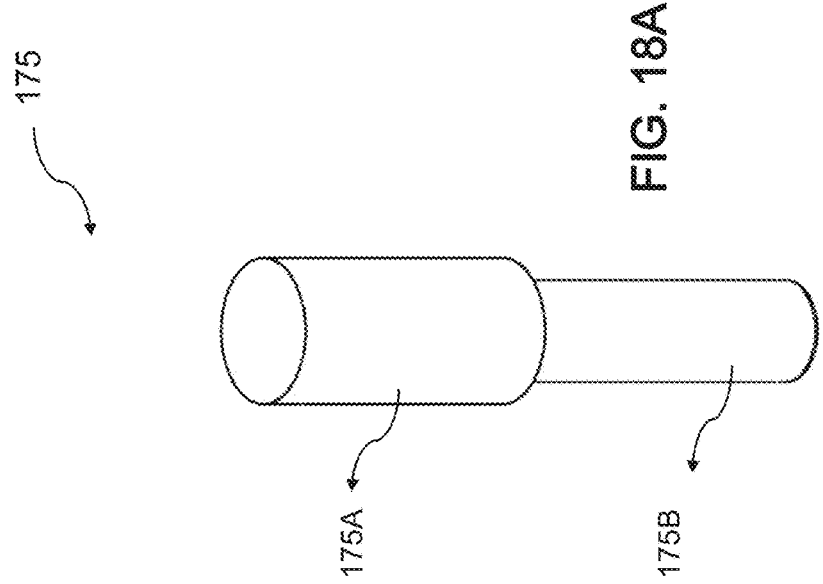
FIG. 18A through FIG. 18C are exemplary schematic drawings of a filleted punch of a fillet punch creep testing machine, in an aspect of providing a method for miniaturized creep testing, in accordance with one or more implementations.
Figure 18B:
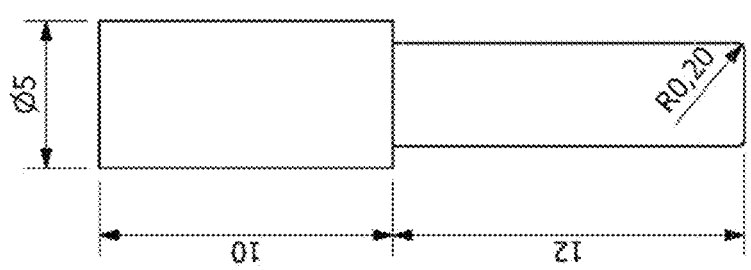
Figure 18C:
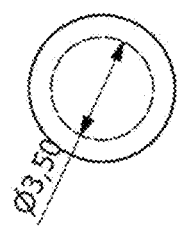

FIG. 18A through FIG. 18C are exemplary schematic drawings of the filleted punch 175 in the system 100 that can be configured to transfer the applied load from the loading rod 162 to the specimen 105. In this exemplary embodiment, FIG. 18A through FIG. 18C respectively illustrate a perspective view, a side view, and a top view of the punch 175. In one implementation, the filleted punch 175 can include a top cylinder 175A and a bottom cylinder 175B in which a bottom end of the bottom cylinder 175B may have a diameter of, e.g., 3.5 mm, and filleted edges of, e.g., 0.2 mm in radius. As one example, specific dimensions for the components of the punch 175 are shown in FIG. 18A through FIG. 18C.

FIG. 19A through FIG. 19C are exemplary schematic drawings of the filleted punch 275 in the improved system 200 that can be configured to transfer the applied load from the loading rod 262 to the specimen 205. In this exemplary embodiment, FIG. 19A through FIG. 19C respectively illustrate a perspective view, a side view, and a top view of the filleted punch 275. In one implementation, a top end of the filleted punch 275 can be in contact with the bottom end of the loading rod 262, and a bottom end of the filleted punch 275 can be in contact with the specimen 205, and the filleted punch 275 can be arranged to freely pass through the central opening 271A of the upper die 271 without resistance. The filleted punch 275 can be made of ceramic, and can include a top cylinder 275A and a bottom cylinder 275B in which a bottom end of the bottom cylinder 275B may have a diameter of, e.g., 3.2 mm, and filleted edges of, e.g., 0.1 mm in radius. The filleted edges of the filleted punch 275 may eliminate stress concentration against the specimen 205 resulting in stable measurements, and thus, reducing an amount of required applied load during creep testing. As one example, specific dimensions for the components of the filleted punch 275 are shown in FIG. 19A through FIG. 19C.

FIG. 20A through FIG. 20C are exemplary schematic drawings of a furnace 282 of the thermal unit 280 that can be arranged to surround the fillet punch unit 270, and to heat the specimen 205. In this exemplary embodiment, FIG. 20A through FIG. 20C respectively illustrate a perspective view, a side view, and a top view of the furnace 282. In one implementation, the thermal unit 280 may include the holder unit 281 shown in FIG. 2A, the furnace 282, a thermocouple 283, and a furnace controller 284. The furnace 282 may be secured to the holder unit 281, and the thermocouple 283 inside the furnace 282 can be adjusted to a desired temperature directed by the furnace controller 284. In an aspect, the furnace 282 may include an electrical furnace with a digital display to track temperature of the furnace 282 measured in real-time by the thermocouple 283. In a further aspect, a top end of the thermal unit 280, as shown in FIG. 2A, may be secured to a bottom end of the top quartz pipe 235, and a bottom end of the thermal unit 280 may be secured to a top end of the bottom quartz pipe 240 in which the top and bottom quartz pipes, 235 and 240, can be made of quartz glass and placed in a refractory core to protect the thermal unit 280 from outside temperature interference. As one example, specific dimensions for the components of the furnace 282 are shown in FIG. 20A through FIG. 20C.

FIG. 21A through FIG. 21C are exemplary schematic drawings of the test specimen 205 that can be configured to be clamped between the upper die 271 and the filleted lower die 273 during creep testing. In this exemplary embodiment, FIG. 21A through FIG. 21C respectively illustrate a perspective view, a side view, and a top view of the specimen 205. In one implementation, the specimen 205 may include a small amount with no constraint in thickness and no need for special specimen preparation, which can result in a non-destructive and timely process to produce different stages of the creep curve during creep testing. As one example, specific dimensions for the components of the specimen 205 are shown in FIG. 21A through FIG. 21C.

Figure 22:
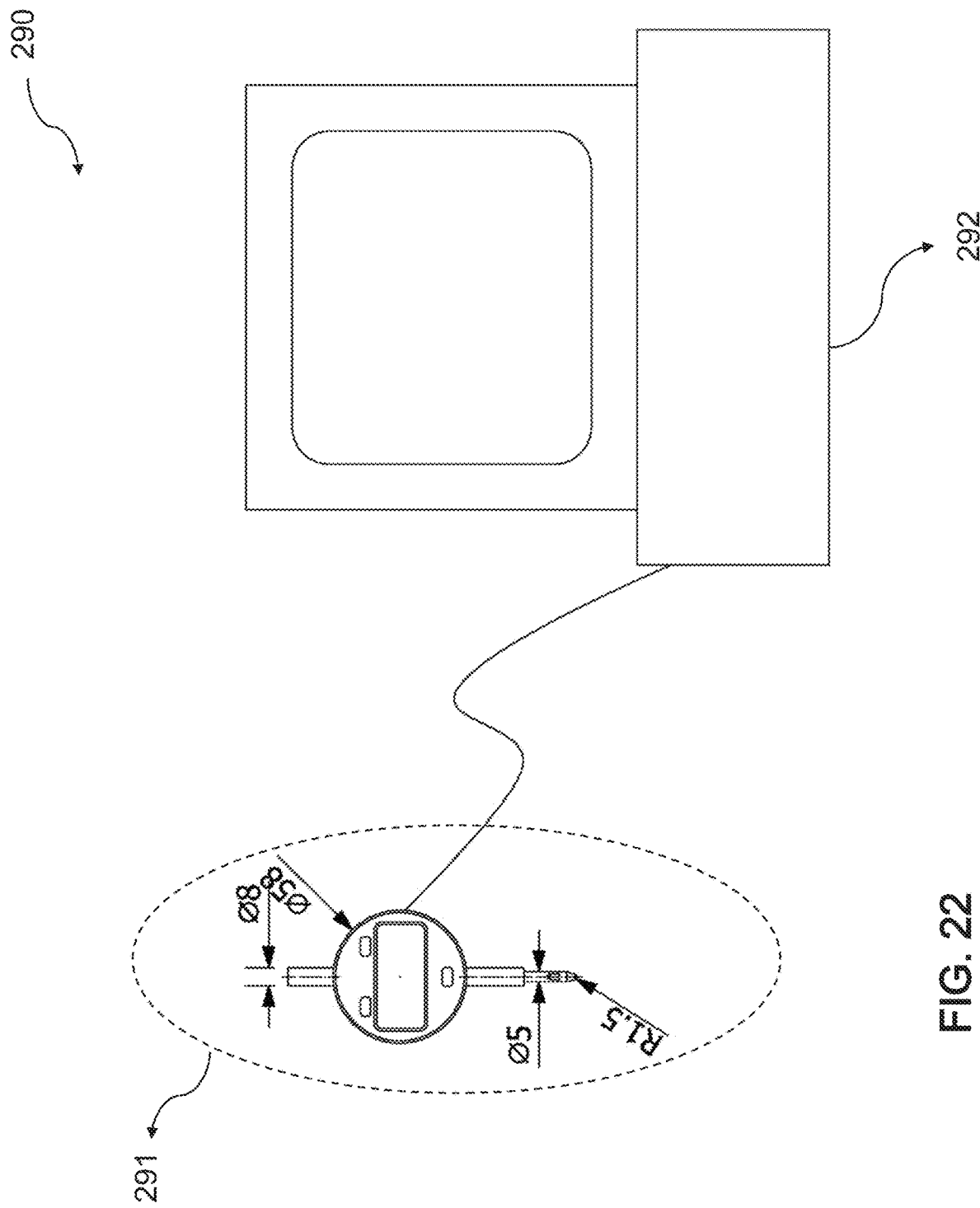
FIG. 22 is an exemplary schematic drawing of a measuring unit of an improved fillet punch creep testing machine, in an aspect of providing an improved method for miniaturized creep testing, in accordance with one or more implementations.

FIG. 22 is an exemplary schematic drawing of the measuring unit 290 that can be configured to measure and analyze testing results during creep testing. In this exemplary embodiment, FIG. 22 illustrate a perspective view of the measuring unit. In one implementation, the measuring unit 290 may include a motion sensor 291 and a data storage unit 292 in which the motion sensor 291 can be in contact with the loading rod 262, and can be configured to instantaneously measure an amount of displacement of the loading rod 262. The data storage unit 292 can be connected to the motion sensor 291 to analyze the measured data, and to produce different stages of a creep curve for the specimen 205. In an aspect, the data storage unit 292 can be a personal computer. In a related aspect, the motion sensor 291 can measure displacements, for example, in every 30 seconds during creep testing. The motion sensor 291 can be an extensometer, and have a minimum accuracy of, e.g., 5 µm. As one example, specific dimensions of the motion sensor 291 are shown in FIG. 22.

Figure 28A:
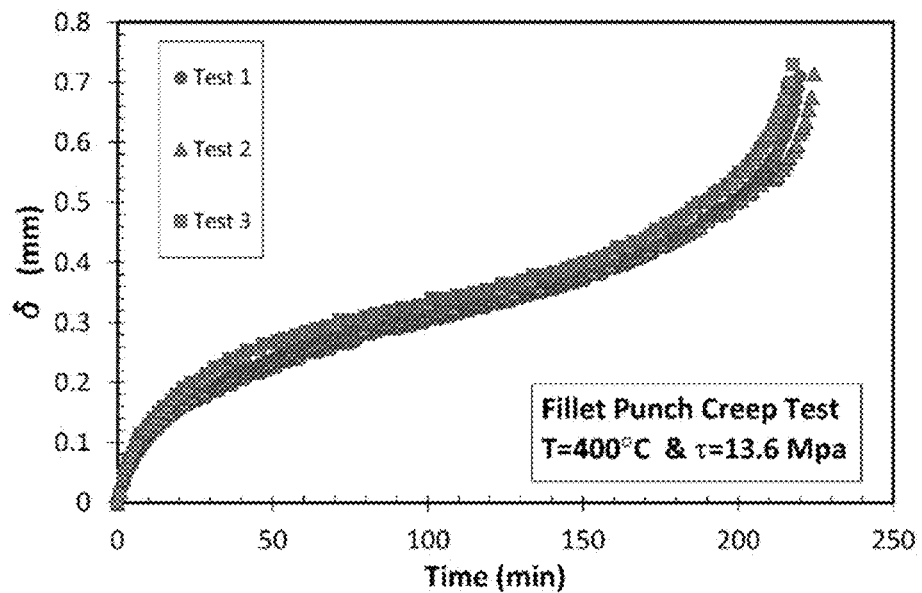
FIG. 28A and FIG. 28B are exemplary charts showing creep curve of displacements over time for the improved vs. prior art fillet punch creep testing machine, in an aspect of providing an improved method for miniaturized creep testing, in accordance with one or more implementations.
Figure 28B:
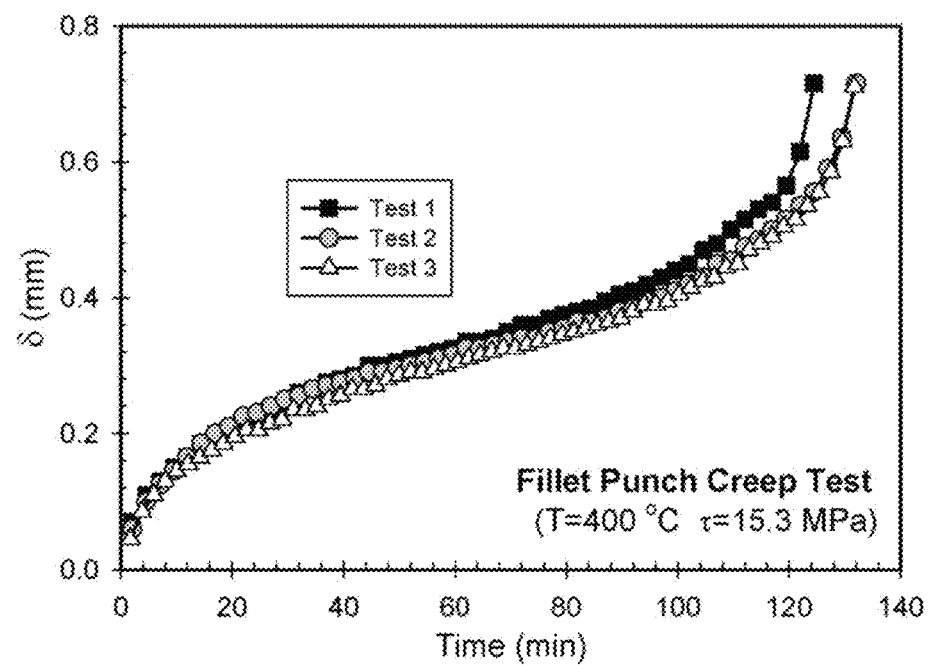

To investigate the applicability of the improved method of fillet punch creep testing, the method was applied to a sample specimen made of aluminum alloy (A12024-T851). Creep properties of such sample were then compared to the prior art creep testing method in order to determine the effects of the improved method. FIG. 28A and FIG. 28B are exemplary creep curves for the sample tested using the improved Fillet Punch Creep Test (FPCT) as compared to prior art method.

Figure 29A:
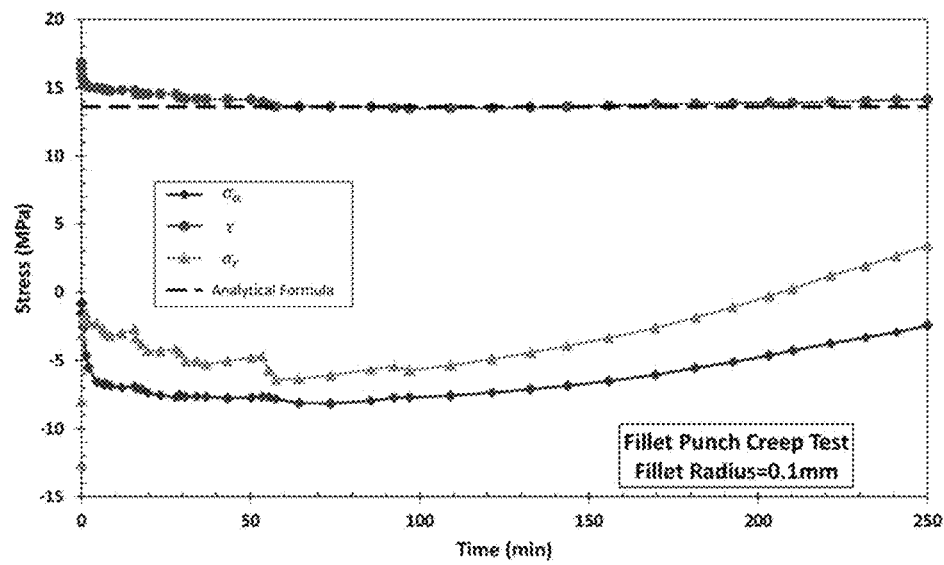
FIG. 29A and FIG. 29B are exemplary charts showing creep properties of an exemplary analytical stress variation creep curve over time for the improved vs. prior art fillet punch creep testing machine, in an aspect of providing an improved method for miniaturized creep testing, in accordance with one or more implementations.
Figure 29B:
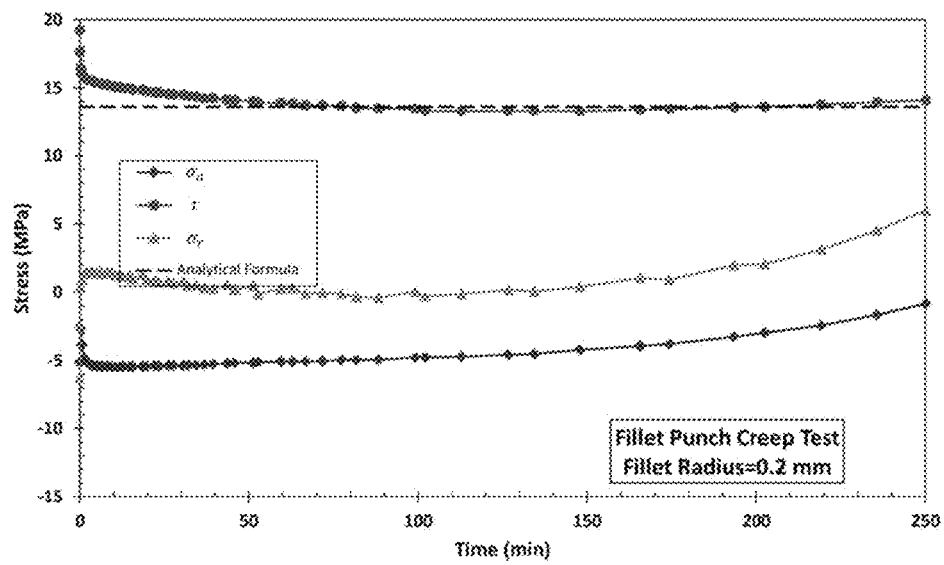

FIG. 29A and FIG. 29B are exemplary analytical stress variation creep curve over time for the improved vs. prior art FPCT. In this exemplary illustration, the variation of stresses during creep testing may represent axial and shear stresses in which the shear stresses in the improved FPCT with fillet radii of 0.1 mm represent a much closer harmony to the obtained numerical values when compared to that of in the prior art FPCT with fillet radii of 0.2 mm. In an aspect, the curves may be produced using a numerical package technique such as Finite Element Method.

Accordingly, the improved apparatus and method for fillet punch creep testing machine in the present invention can provide an efficient mechanism for conducting creep testing by using a small specimen with no constraint in thickness and no need for special specimen preparation, which results in a non-destructive and less time-consuming process to produce different stages of a creep curve during creep testing. The evident results reveal that eliminating stress concentration against the specimen can result in stable measurements, and thus, can reduce the dispersion of applied load on the specimen during creep testing. Also, the application of a constant load from the loading weight on the loading rod to the filleted punch, and subsequently to the specimen can prevent dispersion in the measured data, and can allow creep testing to be repeated to predict a remaining life of in-service parts of a system. Finally, the fillet punch creep testing functions based on pure shear force, and thus, can enable a comparison of creep testing measurements with a Standard Creep Test.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. An apparatus for fillet punch creep testing on a specimen, comprising:
a structural support unit having a top end and a bottom end; and
a testing unit extending between the top and bottom ends of the structural support unit, and configured to conduct creep testing on the specimen;
wherein:
the structural support unit includes an upper plate, a lower plate, a plurality of columns, a plurality of column supports, a top quartz pipe, a bottom quartz pipe, and a plurality of quartz supports,
each column extends between the upper and lower plates, and is connected to the plates by a corresponding one of the column supports,
the top and bottom quartz pipes are connected respectively from one end to the upper and lower plates by a corresponding one of the quartz supports,
the testing unit includes a loading unit, a fillet punch unit, a thermal unit, and a measuring unit,
the loading unit includes a loading weight, a loading rod, and a supporting rod, and is secured to the structural support unit and arranged to apply direct loading to the specimen,
the fillet punch unit includes an upper die, an upper die holder, a filleted lower die, a lower die holder, and a filleted punch, and is arranged to transfer the applied load to the specimen clamped between the upper die and the filleted lower die, and the filleted lower die and the filleted punch have filleted edges of 0.1 mm in radii which eliminate stress concentration against the specimen resulting in stable measurements, thus, reducing dispersion of the applied load during creep testing,
the thermal unit surrounds the fillet punch unit, and is configured to heat the specimen, and
the measuring unit is in contact with the fillet punch unit, and is configured to measure displacement and to produce a creep curve,
the measuring unit includes a motion sensor, and a data storage unit in which:
the motion sensor is in contact with the loading rod, and is configured to instantaneously measure an amount of displacement of the loading rod at predetermined time intervals during creep testing, and
the data storage unit is connected to the motion sensor to analyze the received displacement data, and to produce a creep curve for the specimen.

2. The apparatus of claim 1, wherein the upper plate includes a central opening, a plurality of central connections, and a plurality of peripheral connections in which:
the central opening is arranged to allow the loading rod to move through the top end of the structural support unit,
each central connection is configured to connect the upper plate to a top end of the top quartz pipe, and
each peripheral connection is configured to connect the upper plate to a top end of one of the corresponding columns by the corresponding column supports.

3. The apparatus of claim 1, wherein the lower plate includes a central opening, a plurality of central connections, and a plurality of peripheral connections in which:
the central opening is arranged to secure the supporting rod to the bottom end of the structural support unit,
each central connection is configured to connect the lower plate to a bottom end of the bottom quartz pipe, and
each peripheral connection is configured to connect the lower plate to a bottom end of one of the corresponding columns by the corresponding column supports.

4. The apparatus of claim 1, wherein:
a top end of the loading rod is connected to a bottom end of the loading weight, and a bottom end of the loading rod is in contact with a top end of the fillet punch unit, and the loading rod is surrounded by the top quartz pipe, and
a top end of the supporting rod is connected to a bottom end of the fillet punch unit, and a bottom end of the supporting rod is connected to the lower plate, and the supporting rod is surrounded by the bottom quartz pipe.

5. The apparatus of claim 4, wherein the loading rod has a cylindrical shape, and includes a bearing connection, which moves freely to secure the loading rod to the upper plate, and to eliminate resistance force at such connection.

6. The apparatus of claim 4, wherein the loading weight applies a constant load on the loading rod, which in turn prevents dispersion in the measured data, and allows creep testing to be repeated to predict a remaining life of in-service parts of a system.

7. The apparatus of claim 1, wherein:
a top end of the upper die extends to the top end of the fillet punch unit, and a bottom end of the upper die is in contact with a top end of the filleted lower die, and the upper die is secured to the upper die holder, and
a bottom end of the filleted lower die extends to the bottom end of the fillet punch unit, and the filleted lower die is secured to the lower die holder.

8. The apparatus of claim 1, wherein:
the upper die has a cylindrical shape, and includes a central opening and a coaxial cylinder of different radii in which the central opening has a diameter of 3.22 mm to serve as a guideline for the filleted punch, and
the filleted lower die has a cylindrical shape, and includes a central opening and a coaxial cylindrical recess in which the central opening has a diameter of 3.25 mm, and filleted edges of 0.1 mm in radius.

9. The apparatus of claim 8, wherein a top end of the filleted punch is in contact with the bottom end of the loading rod, and a bottom end of the filleted punch is in contact with the specimen, and the filleted punch is arranged to pass through the central opening of the upper die and to transfer the applied load from the loading rod to the specimen.

10. The apparatus of claim 8, wherein the filleted punch is made of ceramic, and includes a top cylinder and a bottom cylinder in which a bottom end of the bottom cylinder has filleted edges of 0.1 mm in radius.

11. The apparatus of claim 1, wherein the thermal unit includes a holder unit, a furnace, a thermocouple, and a furnace controller in which the furnace is secured to the holder unit, and the thermocouple inside the furnace is adjusted to a desired temperature directed by the furnace controller.

12. The apparatus of claim 11, wherein the furnace includes an electrical furnace with a digital display to track temperature of the furnace measured in real-time by the thermocouple.

13. The apparatus of claim 1, wherein a top end of the thermal unit is secured to a bottom end of the top quartz pipe, and a bottom end of the thermal unit is secured to a top end of the bottom quartz pipe in which the top and bottom quartz pipes are made of quartz glass.

14. A method of fillet punch creep testing comprising:
loading a specimen into a fillet punch unit, the fillet punch unit being secured to a structural support unit, and including an upper die, an upper die holder, a filleted lower die, a lower die holder, and a filleted punch, the specimen being in contact with a bottom end of the filleted punch, and being clamped between the upper die and the filleted lower die, and the combination of which being secured to the surrounding upper and lower die holders;
applying load to the specimen by a loading unit, the loading unit being secured to the structural support unit, and including a loading weight, a loading rod, and a supporting rod, the loading rod transferring the applied load from the loading weight to a top end of the filleted punch down to the specimen;
heating the specimen by a furnace, the furnace surrounding the fillet punch unit and being secured to a holder unit;
controlling temperature of the specimen by a furnace controller, the furnace controller being in contact with a thermocouple inside the furnace;
measuring displacement of the specimen by a motion sensor, the motion sensor being in contact with the loading rod; and
producing a creep curve for the specimen by analyzing the displacement data being transferred in real-time to a data storage unit;
wherein:
filleted edges in the filleted lower die and the filleted punch eliminate stress concentration and resistance force against the specimen resulting in stable measurements, and thus, reducing an amount of required applied load during creep testing.

15. The method of fillet punch creep testing of claim 14, wherein the upper die and the filleted lower die are cut using a wire-cut machine with an accuracy of 0.01 mm.

16. The method of fillet punch creep testing of claim 14, wherein the filleted edges in the filleted lower die and the filleted punch are of 0.1 mm in radius.

17. The method of fillet punch creep testing of claim 14, wherein the specimen is of a small amount with no constraint in thickness and no need for special specimen preparation, which results in a non-destructive and less time-consuming process to produce different stages of the creep curve during creep testing.

18. The method of fillet punch creep testing of claim 14, wherein the loading weight applies a constant load from the loading rod to the filleted punch, which in turn prevents dispersion in the measured data, and allows creep testing to be repeated to predict a remaining life of in-service parts of a system.

19. The method of fillet punch creep testing of claim 14, wherein the creep testing operates based on shear force, and thus, enables direct comparison between measurements of the fillet punch creep testing with that of a Standard Creep Test.

* * * * *